US012605845B2

(12) United States Patent
Goldberg et al.

(10) Patent No.: US 12,605,845 B2
(45) Date of Patent: Apr. 21, 2026

(54) EN ROUTE FOOD PRODUCT PREPARATION

(71) Applicant: Congruens Group, LLC, San Carlos, CA (US)

(72) Inventors: Joshua Gouled Goldberg, San Carlos, CA (US); Alexander John Garden, San Carlos, CA (US); Vaibhav Goel, San Carlos, CA (US); Tookie Graham, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

(21) Appl. No.: 15/734,127

(22) PCT Filed: Jun. 3, 2019

(86) PCT No.: PCT/US2019/035100
§ 371 (c)(1),
(2) Date: Dec. 1, 2020

(87) PCT Pub. No.: WO2019/232505
PCT Pub. Date: Dec. 5, 2019

(65) Prior Publication Data

US 2021/0217111 A1 Jul. 15, 2021

Related U.S. Application Data

(60) Provisional application No. 62/679,522, filed on Jun. 1, 2018, provisional application No. 62/679,519, filed
(Continued)

(51) Int. Cl.

| | |
|---|---|
| ***B25J 11/00*** | (2006.01) |
| ***A21B 1/52*** | (2006.01) |

(Continued)

(52) U.S. Cl.
CPC ............ *B25J 11/0045* (2013.01); *A21B 1/52* (2013.01); *A47J 36/321* (2018.08); *A47J 44/00* (2013.01);
(Continued)

(58) Field of Classification Search
None
See application file for complete search history.

(56) References Cited

U.S. PATENT DOCUMENTS

| | | |
|---|---|---|
| 377,594 A | 2/1888 | Baldwin |
| 1,263,804 A | 4/1918 | Rice |

(Continued)

FOREIGN PATENT DOCUMENTS

| | | |
|---|---|---|
| AU | 2017248224 A1 | 11/2018 |
| CA | 2952769 A1 | 12/2014 |

(Continued)

OTHER PUBLICATIONS

English Translation of CN-108140154-A. (Year: 2018).*
(Continued)

*Primary Examiner* — Susanna M. Diaz
(74) *Attorney, Agent, or Firm* — Goodwin Procter LLP

(57) ABSTRACT

Technologies are generally described for en route food product preparation. Food product preparation process steps and timing may be determined based on travel information (e.g., starting point, intermediate waypoints, delivery destination, routes, etc.), as well as, food item and food product information. Instructions for robotic devices arranged modularly in a container or truck to execute steps of the food product preparation process and their timing may be transmitted to a controller managing the operations of the robotic devices. Instructions may be updated en route based on changing travel or other conditions.

22 Claims, 12 Drawing Sheets

Related U.S. Application Data on Jun. 1, 2018, provisional application No. 62/700,115, filed on Jul. 18, 2018, provisional application No. 62/700,117, filed on Jul. 18, 2018, provisional application No. 62/779,082, filed on Dec. 13, 2018, provisional application No. 62/779,090, filed on Dec. 13, 2018.

(51) Int. Cl.

| | |
|---|---|
| ***A47J 36/32*** | (2006.01) |
| ***A47J 44/00*** | (2006.01) |
| ***B60P 3/025*** | (2006.01) |
| ***G01C 21/34*** | (2006.01) |
| ***G01C 21/36*** | (2006.01) |
| ***G05B 19/4155*** | (2006.01) |
| ***G06Q 10/0631*** | (2023.01) |
| ***G06Q 10/083*** | (2024.01) |
| ***G06Q 10/0833*** | (2023.01) |
| ***G06Q 50/12*** | (2012.01) |

(52) U.S. Cl.

CPC ........ *B60P 3/0257* (2013.01); *G05B 19/4155* (2013.01); *G06Q 10/06316* (2013.01); *G06Q 10/0833* (2013.01); *G06Q 10/08355* (2013.01); *G06Q 50/12* (2013.01); *A47J 2201/00* (2013.01); *G01C 21/34* (2013.01); *G01C 21/3691* (2013.01); *G05B 2219/39473* (2013.01)

(56) References Cited

U.S. PATENT DOCUMENTS

| | | | | |
|---|---|---|---|---|
| 1,263,805 | A | | 4/1918 | Rice |
| 1,331,241 | A | | 2/1920 | Converse |
| 1,457,233 | A | | 5/1923 | Slovack |
| 1,581,310 | A | | 4/1926 | Fetschan |
| 1,613,223 | A | | 1/1927 | Davis |
| 2,078,840 | A | | 4/1937 | Oscar et al. |
| 2,174,334 | A | | 9/1939 | Steinfels |
| 2,906,020 | A | | 9/1959 | Welsh |
| 3,060,838 | A | | 10/1962 | Priore |
| 3,060,920 | A | | 10/1962 | Dibert |
| 3,132,423 | A | | 5/1964 | De Lano |
| 3,191,590 | A | | 6/1965 | Haley |
| 3,521,030 | A | | 7/1970 | Maahs |
| 3,780,643 | A | | 12/1973 | Papai |
| 3,982,033 | A | | 9/1976 | Zito |
| 3,985,991 | A | | 10/1976 | Levinson |
| 4,112,834 | A | | 9/1978 | Thiry |
| 4,143,902 | A | | 3/1979 | Johnstone |
| 4,250,618 | A | | 2/1981 | Custer et al. |
| 4,372,185 | A | | 2/1983 | Pila |
| 4,373,636 | A | | 2/1983 | Hoffman |
| 4,464,105 | A | | 8/1984 | Voegtlin |
| 4,556,046 | A | | 12/1985 | Riffel et al. |
| 4,632,836 | A | | 12/1986 | Abbott et al. |
| 4,634,365 | A | | 1/1987 | Triporo et al. |
| 4,643,167 | A | | 2/1987 | Brewer |
| 4,656,068 | A | | 4/1987 | Raines |
| 4,716,819 | A | | 1/1988 | Beltz |
| 4,718,769 | A | | 1/1988 | Conkey |
| 4,753,406 | A | | 6/1988 | Kodama et al. |
| 4,790,241 | A | | 12/1988 | Lugo |
| 4,801,097 | A | | 1/1989 | Fitch, Jr. |
| 4,816,646 | A | | 3/1989 | Solomon et al. |
| 4,912,338 | A | | 3/1990 | Bingham |
| 4,919,477 | A | | 4/1990 | Bingham et al. |
| 4,924,763 | A | | 5/1990 | Bingham |
| 5,031,602 | A | | 7/1991 | Vick |
| 5,039,535 | A | | 8/1991 | Lang et al. |
| D326,034 | S | | 5/1992 | Kluesner |
| 5,109,760 | A | | 5/1992 | Ansari |
| D326,749 | S | | 6/1992 | Apps et al. |
| 5,117,749 | A | | 6/1992 | Bakker |
| 5,172,328 | A | * | 12/1992 | Cahlander .............. A47J 27/14 700/211 |
| 5,179,843 | A | | 1/1993 | Cohausz |
| 5,190,780 | A | | 3/1993 | Fehr et al. |
| 5,243,899 | A | | 9/1993 | Moshier et al. |
| 5,244,344 | A | | 9/1993 | Doeberl et al. |
| 5,256,432 | A | | 10/1993 | McDonald et al. |
| 5,285,604 | A | | 2/1994 | Carlin |
| 5,299,557 | A | | 4/1994 | Braithwaite et al. |
| 5,306,192 | A | | 4/1994 | Caveza et al. |
| 5,423,477 | A | | 6/1995 | Valdman et al. |
| 5,454,295 | A | | 10/1995 | Cox et al. |
| 5,458,055 | A | | 10/1995 | Fitch, Jr. |
| 5,493,294 | A | | 2/1996 | Morita |
| 5,505,122 | A | | 4/1996 | Gerrit |
| 5,540,943 | A | | 7/1996 | Naramura |
| 5,562,183 | A | | 10/1996 | Naramura |
| 5,732,610 | A | | 3/1998 | Halladay et al. |
| 5,873,294 | A | | 2/1999 | Sciuto |
| 5,921,163 | A | | 7/1999 | McInnes et al. |
| 5,921,170 | A | | 7/1999 | Khatchadourian et al. |
| 5,997,924 | A | | 12/1999 | Olander, Jr. et al. |
| D426,646 | S | | 6/2000 | Monaghan et al. |
| D426,754 | S | | 6/2000 | Kim |
| 6,127,984 | A | | 10/2000 | Klebe et al. |
| 6,189,944 | B1 | | 2/2001 | Piche |
| 6,320,165 | B1 | | 11/2001 | Ovadia |
| 6,396,031 | B1 | | 5/2002 | Forrester |
| 6,431,628 | B1 | | 8/2002 | Bell, Jr. |
| 6,465,244 | B1 | | 10/2002 | Annable et al. |
| 6,513,671 | B2 | | 2/2003 | Dicello et al. |
| 6,546,847 | B2 | | 4/2003 | Pilati et al. |
| 6,557,260 | B1 | | 5/2003 | Morris |
| 6,568,586 | B1 | | 5/2003 | VanEsley et al. |
| 6,626,996 | B1 | | 9/2003 | Amigh et al. |
| 6,672,601 | B1 | | 1/2004 | Hofheins et al. |
| 6,755,122 | B2 | | 6/2004 | Holmes |
| 6,843,167 | B1 | | 1/2005 | Kanafani et al. |
| 6,858,243 | B2 | | 2/2005 | Blanchet et al. |
| 6,957,111 | B2 | | 10/2005 | Zhu et al. |
| 7,127,984 | B2 | | 10/2006 | Holmes |
| 7,174,830 | B1 | | 2/2007 | Dong |
| 7,263,990 | B1 | | 9/2007 | Lenhart |
| 7,505,929 | B2 | | 3/2009 | Angert et al. |
| D593,363 | S | | 6/2009 | Collinson |
| 7,607,706 | B2 | | 10/2009 | Cunningham et al. |
| 7,678,036 | B1 | | 3/2010 | Malitas et al. |
| 7,778,773 | B2 | | 8/2010 | Yaqub et al. |
| 7,884,306 | B2 | | 2/2011 | Leach |
| 7,984,667 | B2 | | 7/2011 | Freudinger |
| 8,126,938 | B2 | | 2/2012 | Cohen et al. |
| 8,276,505 | B2 | | 10/2012 | Buehler |
| D678,005 | S | | 3/2013 | Zemel et al. |
| 8,430,262 | B2 | | 4/2013 | Corbett et al. |
| 8,549,432 | B2 | | 10/2013 | Warner |
| 8,561,823 | B1 | | 10/2013 | Krupa |
| 8,663,419 | B2 | | 3/2014 | Corbett et al. |
| 8,710,408 | B2 | | 4/2014 | Khatchadourian et al. |
| 8,732,087 | B2 | | 5/2014 | Cohen et al. |
| 8,807,377 | B2 | | 8/2014 | Corbett et al. |
| 8,860,587 | B2 | | 10/2014 | Nordstrom |
| D720,227 | S | | 12/2014 | Corbett et al. |
| 8,991,635 | B2 | | 3/2015 | Myerscough |
| 9,010,621 | B2 | | 4/2015 | Baker et al. |
| 9,126,717 | B2 | | 9/2015 | Myerscough |
| 9,126,719 | B2 | | 9/2015 | Corbett et al. |
| D743,302 | S | | 11/2015 | Weiner et al. |
| D743,311 | S | | 11/2015 | Weiner et al. |
| 9,292,889 | B2 | | 3/2016 | Garden |
| D754,250 | S | | 4/2016 | Elmer |
| 9,305,280 | B1 | | 4/2016 | Berg et al. |
| 9,321,387 | B2 | | 4/2016 | Lamb |
| 9,387,786 | B2 | | 7/2016 | Weiner et al. |
| 9,446,889 | B2 | | 9/2016 | Lopes et al. |
| D774,900 | S | | 12/2016 | Longoni et al. |
| 9,522,761 | B2 | | 12/2016 | Baker et al. |
| 9,788,157 | B2 | | 10/2017 | Shaffer et al. |

(56) References Cited

U.S. PATENT DOCUMENTS 9,815,191 B2 11/2017 Oleynik
9,840,340 B2 12/2017 O'Toole
9,895,798 B2 2/2018 Helmer
9,914,223 B2 3/2018 Fritz-Jung et al.
9,928,540 B1 3/2018 Gerard et al.
10,019,143 B1 7/2018 Haitani et al.
10,049,236 B1 8/2018 Alkarmi et al.
10,140,587 B2 11/2018 Garden
10,222,798 B1 3/2019 Brady et al.
10,241,516 B1 3/2019 Brady et al.
10,303,171 B1 5/2019 Brady et al.
10,311,530 B2 6/2019 Becker et al.
10,604,055 B2 3/2020 Eismann
D893,247 S 8/2020 Chiang et al.
11,304,421 B2 4/2022 Handwerker
11,523,616 B2 12/2022 Mecsaci
11,816,624 B2 11/2023 Goldberg
12,005,566 B2 6/2024 Goldberg et al.
2002/0048624 A1 4/2002 Blanchet et al.
2002/0148831 A1 10/2002 Dicello et al.
2002/0153370 A1 10/2002 Stutman
2002/0170303 A1 11/2002 Clark et al.
2002/0176921 A1 11/2002 Torghele et al.
2003/0020914 A1 1/2003 Jackson
2003/0037681 A1 2/2003 Zhu et al.
2003/0113414 A1* 6/2003 Nolfi, Jr. ................. B65B 55/02 426/106
2003/0136782 A1 7/2003 Dicello et al.
2003/0194476 A1 10/2003 Shefet
2003/0209194 A1 11/2003 Amigh et al.
2004/0020375 A1 2/2004 Holmes
2004/0026946 A1 2/2004 Reed et al.
2004/0156963 A1 8/2004 Amoroso
2004/0192351 A1 9/2004 Duncan
2004/0194641 A1 10/2004 Holmes
2004/0253348 A1 12/2004 Woodward et al.
2004/0255795 A1 12/2004 Holmes
2005/0021407 A1 1/2005 Kargman
2005/0193901 A1 9/2005 Buehler
2005/0214415 A1 9/2005 Craig et al.
2005/0256774 A1 11/2005 Clothier et al.
2006/0010037 A1 1/2006 Angert et al.
2006/0027106 A1 2/2006 Craig et al.
2006/0049198 A1 3/2006 Guard
2006/0111838 A1 5/2006 Hughes
2006/0182603 A1 8/2006 Hawes
2006/0226669 A1 10/2006 Tong et al.
2007/0160715 A1 7/2007 Elnakib et al.
2007/0216179 A1 9/2007 Hirooka et al.
2007/0221029 A1 9/2007 Freudinger
2008/0000358 A1 1/2008 Goeckner et al.
2008/0023459 A1 1/2008 Leach
2008/0178749 A1 7/2008 Stutman
2008/0203746 A1 8/2008 Cunningham et al.
2008/0250869 A1 10/2008 Breed et al.
2008/0275643 A1 11/2008 Yaqub et al.
2009/0048890 A1 2/2009 Burgh
2009/0057381 A1 3/2009 Gokhale
2009/0146846 A1 6/2009 Grossman
2009/0241481 A1 10/2009 Sus et al.
2010/0179878 A1 7/2010 Dawson et al.
2010/0182136 A1* 7/2010 Pryor ...................... G06F 3/017 340/425.5
2010/0200591 A1 8/2010 Myerscough
2010/0300230 A1 12/2010 Helmer
2010/0328048 A1 12/2010 Meli, Jr. et al.
2011/0036846 A1 2/2011 Corbett et al.
2011/0209661 A1 9/2011 Fritz-Jung et al.
2011/0220652 A1 9/2011 Corbett et al.
2011/0235463 A1 9/2011 Justusson et al.
2011/0258011 A1 10/2011 Burns et al.
2012/0019110 A1 1/2012 Ono et al.
2012/0024859 A1 2/2012 Longoni et al.
2012/0024897 A1 2/2012 Corbett et al.
2012/0068946 A1 3/2012 Tang et al.
2012/0175367 A1 7/2012 Lopes et al.
2013/0101709 A1 4/2013 Rader
2013/0232029 A1 9/2013 Rovik et al.
2013/0253833 A1 9/2013 Tuukkanen
2013/0331989 A1 12/2013 Umeno et al.
2014/0069413 A1 3/2014 Galatte et al.
2014/0089077 A1 3/2014 Zuckerman et al.
2014/0095311 A1 4/2014 Bulloch, Jr. et al.
2014/0196411 A1 7/2014 Procyshyn et al.
2014/0209634 A1 7/2014 Metropulos et al.
2014/0239020 A1 8/2014 Lamb
2014/0249913 A1 9/2014 Endo
2014/0330738 A1* 11/2014 Falcone ........... G06Q 10/08355 705/338
2014/0330739 A1 11/2014 Falcone et al.
2014/0338237 A1 11/2014 Chu et al.
2014/0370167 A1* 12/2014 Garden .................. G06Q 50/12 99/325
2015/0006005 A1 1/2015 Yu et al.
2015/0019354 A1* 1/2015 Chan .................... G06Q 10/109 99/325
2015/0025975 A1 1/2015 Wallach
2015/0068945 A1 3/2015 Baker et al.
2015/0068946 A1 3/2015 Baker et al.
2015/0088779 A1* 3/2015 Falcone ............... G06Q 10/083 705/330
2015/0120504 A1 4/2015 Todasco
2015/0142594 A1 5/2015 Lutnick et al.
2015/0161446 A1 6/2015 Kirkpatrick
2015/0161667 A1 6/2015 Stevens et al.
2015/0170099 A1 6/2015 Beach-Drummond
2015/0256534 A1 9/2015 Goudy et al.
2015/0262121 A1 9/2015 Riel-Dalpe et al.
2015/0290795 A1* 10/2015 Oleynik ................. B25J 9/0081 700/257
2015/0343933 A1 12/2015 Weiner et al.
2015/0343936 A1 12/2015 Weiner et al.
2016/0053514 A1 2/2016 Savage et al.
2016/0054163 A1 2/2016 Walton et al.
2016/0058065 A1 3/2016 Mantry et al.
2016/0063435 A1 3/2016 Shah et al.
2016/0066732 A1 3/2016 Sarvestani
2016/0073644 A1 3/2016 Dickey
2016/0104339 A1 4/2016 Saccone, Jr.
2016/0162833 A1 6/2016 Garden
2016/0200438 A1 7/2016 Bokeno et al.
2016/0251101 A1 9/2016 Kong et al.
2016/0260161 A1 9/2016 Atchley et al.
2016/0264033 A1 9/2016 Tollefson et al.
2016/0275470 A1* 9/2016 Straw ................. G06Q 20/3224
2016/0292798 A1 10/2016 Berry et al.
2016/0350837 A1 12/2016 Williams et al.
2016/0353235 A1 12/2016 Williams et al.
2016/0364679 A1 12/2016 Cao
2016/0371983 A1 12/2016 Ronning et al.
2017/0010608 A1 1/2017 High et al.
2017/0011319 A1 1/2017 Elliot et al.
2017/0024789 A1* 1/2017 Frehn ..................... G06Q 50/12
2017/0024806 A1 1/2017 High et al.
2017/0038122 A1 2/2017 Lu et al.
2017/0055535 A1 3/2017 Froelicher et al.
2017/0055752 A1 3/2017 Mueller et al.
2017/0115009 A1 4/2017 Ramphos et al.
2017/0124670 A1 5/2017 Becker et al.
2017/0146361 A1 5/2017 Lucas et al.
2017/0148075 A1 5/2017 High et al.
2017/0178066 A1 6/2017 High et al.
2017/0178072 A1 6/2017 Poornachandran et al.
2017/0216179 A1 8/2017 Bize et al.
2017/0223772 A1 8/2017 Shingler
2017/0265687 A1 9/2017 Veltrop et al.
2017/0275077 A1 9/2017 Chiang et al.
2017/0282374 A1 10/2017 Matula et al.
2017/0290345 A1 10/2017 Garden et al.
2017/0318821 A1 11/2017 Gallon et al.
2017/0337511 A1 11/2017 Shroff et al.
2017/0345033 A1 11/2017 Wilkinson et al.
2017/0348854 A1 12/2017 Oleynik

(56) References Cited

U.S. PATENT DOCUMENTS

| | | | |
|---|---|---|---|
| 2018/0025445 A1* | 1/2018 | Becker | G06Q 20/3224 705/15 |
| 2018/0032997 A1 | 2/2018 | Gordon et al. | |
| 2018/0053369 A1 | 2/2018 | High et al. | |
| 2018/0056751 A1* | 3/2018 | Kiarostami | B60H 1/2209 |
| 2018/0060943 A1 | 3/2018 | Mattingly et al. | |
| 2018/0070776 A1* | 3/2018 | Ganninger | A21C 9/08 |
| 2018/0071939 A1 | 3/2018 | Garden et al. | |
| 2018/0105344 A1 | 4/2018 | Chiang et al. | |
| 2018/0121037 A1 | 5/2018 | Wajda et al. | |
| 2018/0127192 A1 | 5/2018 | Cohen | |
| 2018/0141682 A1 | 5/2018 | Blake et al. | |
| 2018/0158153 A1* | 6/2018 | Ekin | B60P 3/0257 |
| 2018/0194257 A1 | 7/2018 | Eismann | |
| 2018/0253805 A1 | 9/2018 | Kelly et al. | |
| 2018/0321679 A1 | 11/2018 | Nixon | |
| 2018/0322413 A1 | 11/2018 | Yocam et al. | |
| 2018/0328591 A1 | 11/2018 | Eggers | |
| 2018/0338504 A1* | 11/2018 | Lavri | A21C 3/02 |
| 2019/0012625 A1 | 1/2019 | Lawrenson et al. | |
| 2019/0034967 A1 | 1/2019 | Ferguson et al. | |
| 2019/0037855 A1 | 2/2019 | Hamon et al. | |
| 2019/0047457 A1 | 2/2019 | Eismann | |
| 2019/0047460 A1 | 2/2019 | Goldberg et al. | |
| 2019/0049988 A1 | 2/2019 | Meij | |
| 2019/0050797 A1 | 2/2019 | Goldberg et al. | |
| 2019/0050798 A1 | 2/2019 | Goldberg et al. | |
| 2019/0050799 A1 | 2/2019 | Goldberg et al. | |
| 2019/0050800 A1 | 2/2019 | Garden | |
| 2019/0050801 A1 | 2/2019 | Garden | |
| 2019/0050802 A1 | 2/2019 | Garden | |
| 2019/0050803 A1 | 2/2019 | Garden | |
| 2019/0050804 A1 | 2/2019 | Garden | |
| 2019/0050951 A1 | 2/2019 | Goldberg et al. | |
| 2019/0050952 A1 | 2/2019 | Goldberg et al. | |
| 2019/0051083 A1 | 2/2019 | Goldberg et al. | |
| 2019/0051086 A1 | 2/2019 | Goldberg et al. | |
| 2019/0051087 A1 | 2/2019 | Goldberg et al. | |
| 2019/0051090 A1 | 2/2019 | Goldberg et al. | |
| 2019/0056751 A1 | 2/2019 | Ferguson et al. | |
| 2019/0090679 A1* | 3/2019 | Peng | G05B 19/042 |
| 2019/0111955 A1 | 4/2019 | Canoso et al. | |
| 2019/0188640 A1 | 6/2019 | Yamaguchi et al. | |
| 2019/0196498 A1 | 6/2019 | Matsuoka et al. | |
| 2019/0236961 A1 | 8/2019 | Kaneko et al. | |
| 2019/0270398 A1 | 9/2019 | Goldberg et al. | |
| 2019/0279181 A1 | 9/2019 | Kelly et al. | |
| 2019/0285283 A1 | 9/2019 | Ebrom et al. | |
| 2019/0370915 A1 | 12/2019 | Garden et al. | |
| 2020/0070717 A1 | 3/2020 | Garden et al. | |
| 2020/0090226 A1 | 3/2020 | Garden et al. | |
| 2020/0143295 A1 | 5/2020 | Sakurada | |
| 2020/0143688 A1 | 5/2020 | Shah et al. | |
| 2020/0154949 A1 | 5/2020 | Klein et al. | |
| 2020/0159188 A1 | 5/2020 | He | |
| 2020/0160463 A1 | 5/2020 | He | |
| 2020/0167722 A1 | 5/2020 | Goldberg | |
| 2020/0175467 A1 | 6/2020 | Goldberg et al. | |
| 2020/0238534 A1 | 7/2020 | Goldberg et al. | |
| 2020/0334628 A1 | 10/2020 | Goldberg et al. | |
| 2020/0397194 A1 | 12/2020 | Goldberg et al. | |
| 2021/0097905 A1 | 4/2021 | Garden et al. | |
| 2021/0213618 A1 | 7/2021 | Goldberg | |
| 2021/0298312 A1 | 9/2021 | Handwerker | |
| 2022/0079169 A1 | 3/2022 | Mecsaci | |

FOREIGN PATENT DOCUMENTS

| | | | | |
|---|---|---|---|---|
| CN | 100588328 C | 2/2010 | | |
| CN | 202262349 U | 6/2012 | | |
| CN | 102750658 A | 10/2012 | | |
| CN | 103037697 A | 4/2013 | | |
| CN | 104519746 A | 4/2015 | | |
| CN | 105556562 A | 5/2016 | | |
| CN | 108125571 A | 6/2018 | | |
| CN | 108140154 A * | 6/2018 | A47G 23/08 | |
| CN | 109475129 A | 3/2019 | | |
| DE | 29606255 U1 | 8/1996 | | |
| EP | 550018 A1 | 7/1993 | | |
| EP | 563413 A1 | 10/1993 | | |
| EP | 2230184 B1 | 8/2012 | | |
| EP | 1685045 B2 | 12/2014 | | |
| EP | 2984618 B1 | 9/2018 | | |
| EP | 2858507 B1 | 2/2019 | | |
| FR | 2485340 A1 | 12/1981 | | |
| FR | 3027148 B1 | 12/2016 | | |
| FR | 3047146 A1 | 8/2017 | | |
| FR | 3047149 A1 | 8/2017 | | |
| FR | 3047150 A1 | 8/2017 | | |
| FR | 3047158 A1 | 8/2017 | | |
| GB | 2395893 A | 6/2004 | | |
| JP | H09267276 A | 10/1997 | | |
| JP | 2001505064 A | 4/2001 | | |
| JP | 2002010731 A | 1/2002 | | |
| JP | 2002-80110 A | 3/2002 | | |
| JP | 2002-347944 A | 12/2002 | | |
| JP | 2003102447 A | 4/2003 | | |
| JP | 2003240405 A | 8/2003 | | |
| JP | 2005225576 A | 8/2005 | | |
| JP | 2009034760 A | 2/2009 | | |
| JP | 4741267 B2 | 8/2011 | | |
| JP | 5244344 B2 | 7/2013 | | |
| JP | 2013252601 A | 12/2013 | | |
| JP | 2015526063 A | 9/2015 | | |
| KR | 20-0360448 | 8/2004 | | |
| KR | 10-2009-0098949 A | 9/2009 | | |
| KR | 20110062522 A | 6/2011 | | |
| KR | 20150065076 A | 6/2015 | | |
| KR | 10-2015-0121771 A | 10/2015 | | |
| KR | 101759091 B1 | 7/2017 | | |
| KR | 20190029249 A | 3/2019 | | |
| TW | 201303784 A | 1/2013 | | |
| TW | 201351313 A | 12/2013 | | |
| TW | 201740340 A | 11/2017 | | |
| TW | 201811517 A | 4/2018 | | |
| WO | 9208358 A1 | 5/1992 | | |
| WO | 2001067869 A1 | 9/2001 | | |
| WO | 2012/005683 A1 | 1/2012 | | |
| WO | 2013162702 A1 | 10/2013 | | |
| WO | 2013184910 A1 | 12/2013 | | |
| WO | 2014026273 A1 | 2/2014 | | |
| WO | 2014205041 A1 | 12/2014 | | |
| WO | 2014205549 A1 | 12/2014 | | |
| WO | 2015/006649 A1 | 1/2015 | | |
| WO | 2015125017 A3 | 6/2016 | | |
| WO | 2016094765 A1 | 6/2016 | | |
| WO | 2016/169654 A1 | 10/2016 | | |
| WO | 2017019501 A1 | 2/2017 | | |
| WO | 2017134147 A1 | 8/2017 | | |
| WO | 2017134149 A1 | 8/2017 | | |
| WO | 2017134150 A1 | 8/2017 | | |
| WO | 2017134153 A1 | 8/2017 | | |
| WO | 2017134156 A1 | 8/2017 | | |
| WO | 2017134417 A2 | 8/2017 | | |
| WO | 2017165415 A1 | 9/2017 | | |
| WO | 2017177041 A2 | 10/2017 | | |
| WO | 2017205758 A1 | 11/2017 | | |
| WO | 2018039549 A1 | 3/2018 | | |
| WO | 2018052583 A1 | 3/2018 | | |
| WO | 2018052842 A1 | 3/2018 | | |
| WO | WO-2018165105 A1 * | 9/2018 | A23L 5/10 | |
| WO | 2018236668 A1 | 12/2018 | | |
| WO | 2019014020 A1 | 1/2019 | | |
| WO | 2019014023 A1 | 1/2019 | | |
| WO | 2019014027 A1 | 1/2019 | | |
| WO | 2019014030 A1 | 1/2019 | | |
| WO | 2019050615 A1 | 3/2019 | | |
| WO | 2019070733 A1 | 4/2019 | | |

(56) References Cited

FOREIGN PATENT DOCUMENTS

| | | | |
|---|---|---|---|
| WO | 2019079345 | A1 | 4/2019 |
| WO | 2019232505 | A1 | 12/2019 |
| WO | 2019232506 | A1 | 12/2019 |

OTHER PUBLICATIONS

PCT International Preliminary Report on Patentability in Application PCT/US2019/035100, mailed Dec. 10, 2020, 13 pages.
International Search Report for International Application No. PCT/US19/35100 mailed Oct. 8, 2019 (4 pages).
International Written Opinion for International Application No. PCT/US19/35100 mailed Oct. 8, 2019 (44 pages).
PCT International Search Report in Application PCT/US2019/035101, mailed Oct. 17, 2019, 3 pages.
PCT International Written Opinion in Application PCT/US2019/035101, mailed Oct. 17, 2019, 12 pages.
PCT International Preliminary Report on Patentability in Application PCT/US2019/035101, mailed Dec. 1, 2020, 10 pages.
American Planning Association, Regulating Food Trucks, 2015 (Year: 2015).
CPG Insights, "Mobile factories and robotic pizza chefs : Rev your engines," email newsletter, dated May 10, 2018, 13 pages.
Different Degrees of Freedom in Robotics Arms, 4 pages (Year: 2022).
EKIM, "Robots at the Service of taste : EKIM launches the restoration of the future with the first robot cook!" downloaded from https://ekim.fr/ on Jun. 29, 2018, 11 pages.
International Search Report and Written Opinion for International Application No. PCT/US2014/042879, mailed Oct. 22, 2014, 11 pages.
International Search Report and Written Opinion for International Application No. PCT/US2018/037537 mailed on Oct. 1, 2018, 43 Pages.
International Search Report and Written Opinion for International Application No. PCT/US2018/040738 mailed on Feb. 22, 2019, pp. 25.
International Search Report and Written Opinion for PCT/US2018/040714 dated Nov. 16, 2018 in 8 pages.
International Search Report and Written Opinion for PCT/US2018/040730 dated Nov. 14, 2018 in 20 pages.
International Search Report and Written Opinion for PCT/US2018/040765 dated Nov. 16, 2018 in 13 pages.
International Search Report and Written Opinion for PCT/US2018/040785 dated Nov. 19, 2018 in 22 pages.
International Search Report and Written Opinion for PCT/US2018/056144 dated Feb. 12, 2019 in 28 pages.
International Search Report and Written Opinion for PCT/US2019/012755 dated May 8, 2019 in 18 pages.
International Search Report and Written Opinion in Application PCT/US2018/053997, dated Feb. 1, 2019, 15 pages.
International Search Report and Written Opinion in International Application PCT/US2019/064864, mailed Jun. 25, 2020, 18 pages.
International Search Report and Written Opinion of the International Searching Authority, dated Jan. 31, 2018, for International Application No. PCT/US2017/050950, 20 pages.
International Search Report and Written Opinion of the International Searching Authority, dated Nov. 27, 2017, for International Application No. PCT/US2017/026408, 36 pages.
Joussellin, "Pizza: the pizza-machine robots go to the stove," published online Jun. 3, 2018, downloaded from http://www.rtl.fr/actu/futur/pizza-les-robots-pizzaiolos-se-mettent-au-fourneau-7793604225 on Jun. 7, 2018, 8 pages (with machine generated English translation).
Lamb, "Scoop: Little Caesars Has a Patent for a Pizza-Making Robot," Mar. 13, 2018, downloaded from https://thespoon.tech/scoop-little-caesars-has-a-patent-for-a-pizza-making-robot/ on Mar. 14, 2018, 3 pages.
Lloyd Pans, "The Equalizer® Multi-Blade Rocker Knife," downloaded from https://lloydpans.com/landing-pages/the-equalizer-pizza-cutter, on Mar. 5, 2019, 4 pages.
Nourish Technology, "Teaching robots how to cook," Downloaded from https://angel.co/nourish-technology on Jul. 12, 2017, 6 pages.
Ohr, "French food tech startup EKIM raises €2.2 million to start the food "robolution"," published online May 22, 2018, downloaded from http://www.eu-startups.com/2018/05/french-food-tech-startup-ekim-raises-e2-2-million-to-start-the-food-robolution/ on Jun. 7, 2018, 2 pages.
Pershan, "Grocery Delivery Startup Tests A.I. to Outsmart Food Waste (and Amazon)" downloaded from https://sf.eater.com/2018/3/19/16427328/farmstead-sf-grocery-delivery-startup-amazon on Mar. 26, 2018, 3 pages.
Shaw, "Robot Investments Weekly: Pizza Robots, Picking Platform Get Pieces of Funding Pie," published online May 25, 2018, downloaded from https://www.roboticsbusinessreview.com/financial/robot-investments-weekly-pizza-robots-earn-slice-of-funding-pie/?utm_source=newsletter&utm_medium=email&utm_campaign=weekly_roundup&eid=399365852&bid=2127951 on Jun. 7, 2018, 4 pages.
Veebie, "Delicious Food. Zero Wait," downloaded from http://www.veebie.me/ on Oct. 20, 2017, 8 pages.

* cited by examiner

COMPUTING DEVICE 710

COMPUTER-READABLE MEDIUM 720

722
DETERMINE TRAVEL INFORMATION FOR A VEHICLE EQUIPPED TO PREPARE A FOOD PRODUCT EN ROUTE

724
DETERMINE FOOD ITEMS INFORMATION AND FOOD PRODUCT INFORMATION ASSOCIATED WITH THE FOOD PRODUCT TO BE PREPARED

726
DETERMINE FOOD PRODUCT PREPARATION PROCESS

728
DETERMINE TIMING FOR FOOD PRODUCT PREPARATION PROCESS BASED ON THE TRAVEL INFORMATION

730
AUTONOMOUSLY EXECUTE THE FOOD PRODUCT PREPARATION PROCESS IN THE VEHICLE BASED ON THE DETERMINED TIMING SUCH THAT THE FOOD PRODUCT IS PREPARED WHEN THE VEHICLE REACHES A DESTINATION

732
DETERMINE UPDATED TRAVEL INFORMATION WHILE EN ROUTE

734
UPDATE A TIMING AND EXECUTION OF THE FOOD PRODUCT PREPARATION PROCESS BASED ON THE UPDATED TRAVEL INFORMATION

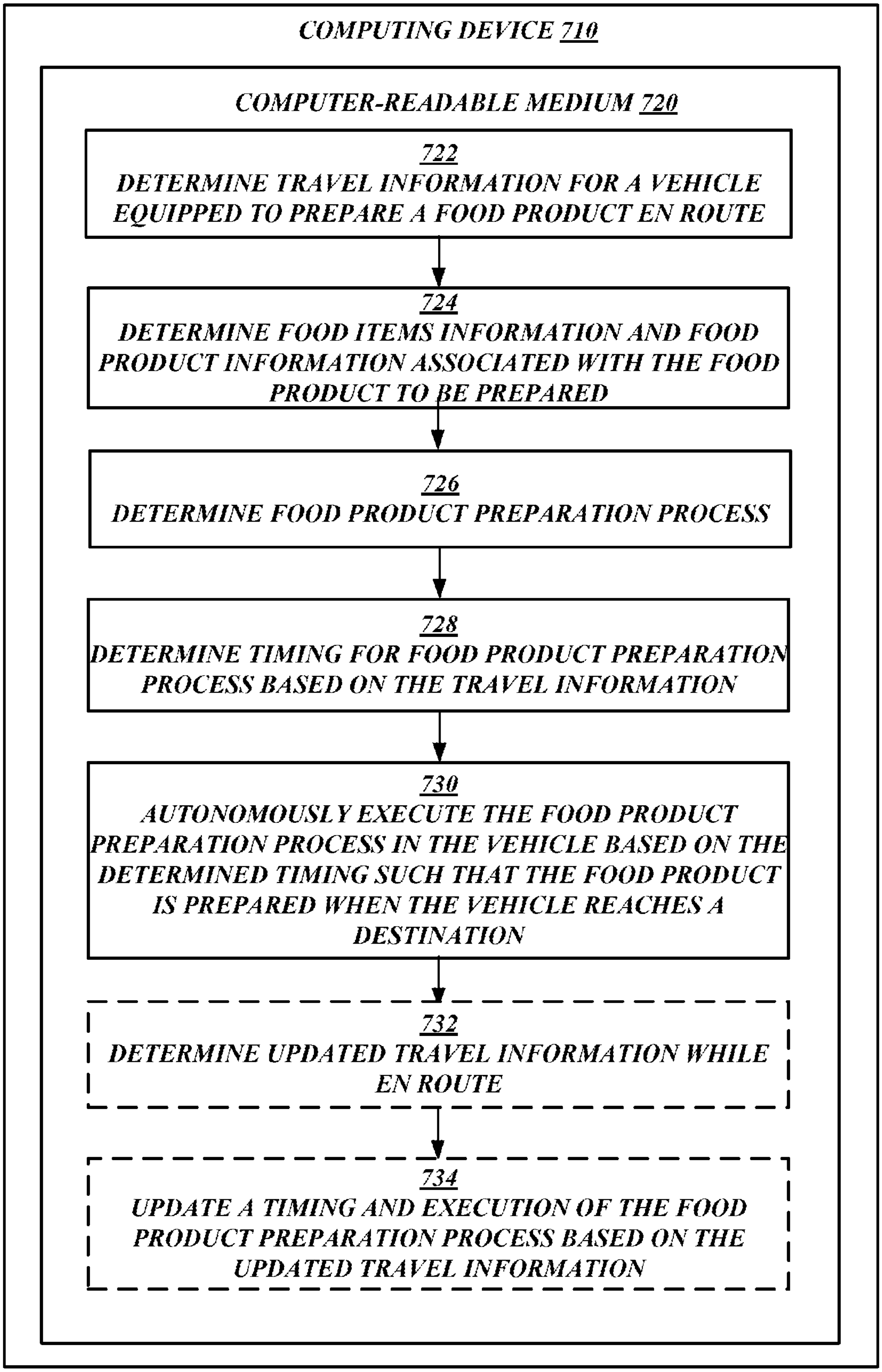

*FIG. 7*

EN ROUTE FOOD PRODUCT PREPARATION

CROSS-REFERENCE TO RELATED APPLICATIONS

This application is a National Stage of International Application No. PCT/US2019/035100, filed Jun. 3, 2019, which claims the benefit of U.S. Provisional Patent Applications Ser. No. 62/679,519 filed on Jun. 1, 2018, Ser. No. 62/679,522 filed on Jun. 1, 2018, Ser. No. 62/700,115 filed on Jul. 18, 2018, Ser. No. 62/700,117 filed on Jul. 18, 2018, Ser. No. 62/779,082 filed on Dec. 13, 2018, and Ser. No. 62/779,090 filed on Dec. 13, 2018. The disclosures of the above-listed provisional applications are hereby incorporated by reference for all purposes.

BACKGROUND

Unless otherwise indicated herein, the materials described in this section are not prior art to the claims in this application and are not admitted to be prior art by inclusion in this section.

Conventional food supply chains often include a source or initial supplier of raw ingredients for food products for human consumption, such as plant-based or animal-based ingredients. The ingredients are often transported from the source to one or more processing facilities, where the raw ingredients are prepared into food products including one or more intermediate ingredients and eventually prepared into marketable food products intended for direct human consumption. The food products are then often transported from the processing facilities to locations where consumers can select and/or consume the food products, such as homes, grocery stores, restaurants, etc.

SUMMARY

The present disclosure generally describes techniques for en route food product preparation.

According to some examples, a method for en route food product preparation is described. The method may include determining travel information for a vehicle equipped to prepare a food product en route; determining food items information and food product information associated with the food product to be prepared; determining one or more steps and a timing for a process to prepare the food product based on the travel information, the food items information, and the food product information; and autonomously executing the process in the vehicle based on the determined one or more steps and the timing such that the food product is prepared when the vehicle reaches a delivery destination.

According to other examples, a modular food product preparation system to prepare food items en route is described. The system may include a container having a first port to receive the food items, a second port to deliver prepared food products, a plurality of anchors, and a plurality of utility ports. The system may also include one or more food preparation and storage equipment attached to the plurality of anchors and configured to execute one or more steps of a process to prepare the food items. The system may further include a controller communicatively coupled to robotic devices on each of the one or more food preparation and storage equipment and at least one remote computing device. The controller may be configured to control operations of the robotic devices to autonomously execute the process en route based on the one or more steps and a timing for each of the steps such that the food product is prepared when the container reaches a delivery destination, where the one or more steps and the timing for the process to prepare the food product are determined based on travel information, food items information, and food product information.

According to further examples, a truck body to prepare food items en route is described. The truck body may include a container having a first port to receive the food items, a second port to deliver prepared food products, a plurality of anchors, and a plurality of utility ports. The truck body may also include one or more food preparation and storage equipment attached to the plurality of anchors and configured to execute one or more steps of a process to prepare the food items. The truck body may further include a controller communicatively coupled to robotic devices on each of the one or more food preparation and storage equipment and at least one remote computing device. The controller may be configured to control operations of the robotic devices to autonomously execute the process en route based on the one or more steps and a timing for each of the steps such that the food product is prepared when the container reaches a delivery destination, where the one or more steps and the timing for the process to prepare the food product are determined based on travel information, food items information, and food product information.

According to yet other examples, a remote controller for en route food product preparation is described. The remote controller may include a communication device configured to communicate with an on-board controller of a modular food product preparation system; a memory to store data; and a processor coupled to the communication device and the memory. The processor, in conjunction with the data stored in the memory, may be configured to receive travel information for the modular food product preparation system; receive food items information and food product information associated with the food product to be prepared; and determine one or more steps and a timing for a process to prepare the food product based on the travel information, the food items information, and the food product information. The processor may also be configured to transmit instructions to control operations of robotic devices in the modular food product preparation system for autonomous execution of the process in the modular food product preparation system based on the determined one or more steps and the timing such that the food product is prepared when the modular food product preparation system reaches a delivery destination.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a flow diagram illustrating an example method for en route food product preparation, at least some of which are arranged in accordance with at least some embodiments described herein.

DETAILED DESCRIPTION

Figure 1A:
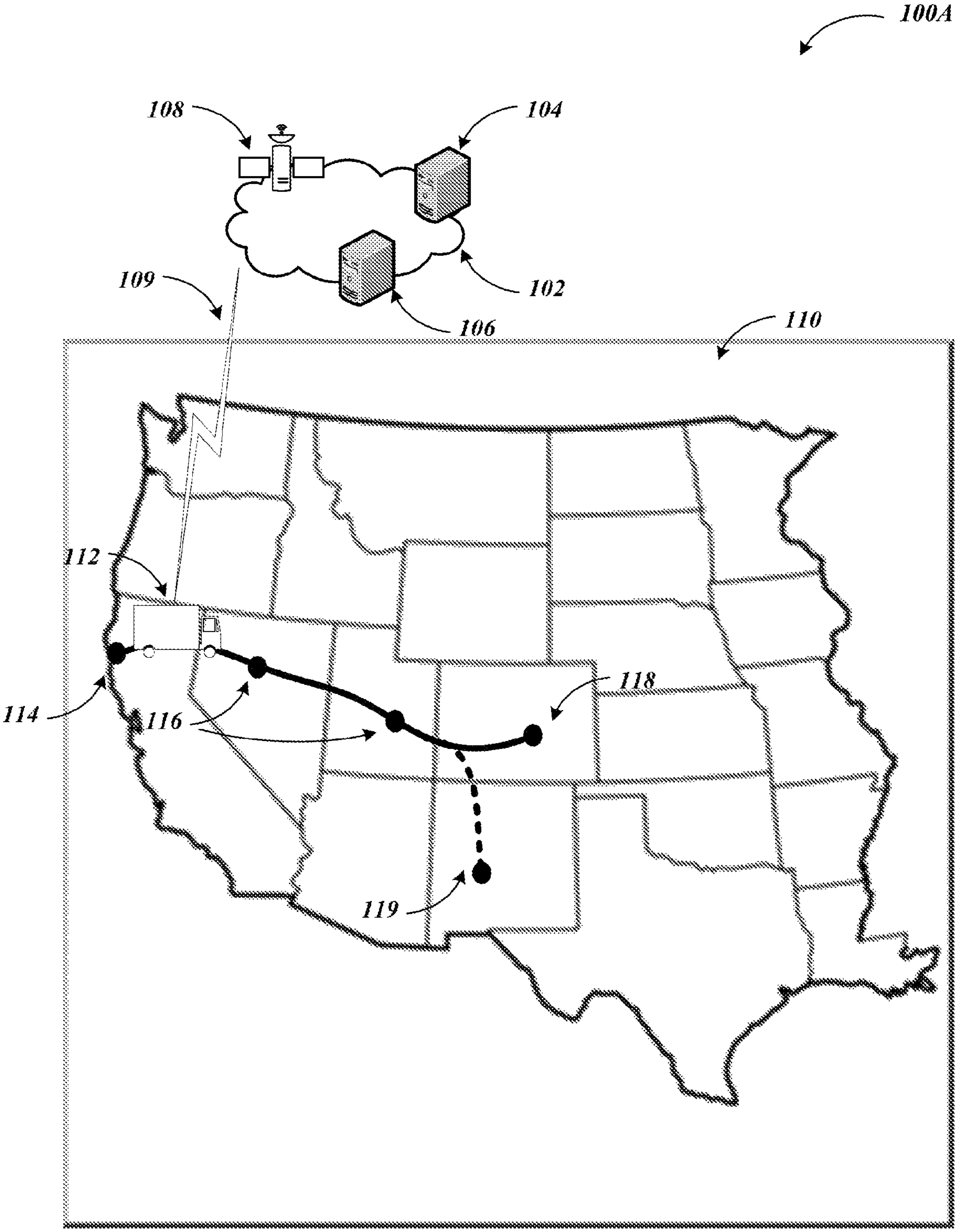
FIG. 1A includes a conceptual illustration of an example long-range truck based en route food product preparation system over a map of Western United States.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to en route food product preparation.

Briefly stated, technologies are generally described for en route food product preparation. Food product preparation process steps and timing may be determined based on travel information (e.g., delivery destination, routes, etc.), as well as, food item and food product information. Instructions for robotic devices arranged modularly in a container or vehicle to execute steps of the food product preparation process and their timing may be transmitted to a controller managing the operations of the robotic devices. Instructions may be updated en route based on changing travel information or other conditions. As used herein destination means any one or more of staring point, intermediate waypoints, final delivery destination, etc.

FIG. 1A includes a conceptual illustration of an example long-range truck based en route food product preparation system over a map of Western United States, arranged in accordance with at least some embodiments described herein.

Food product delivery may be long distance such as interstate but may also be short-distance such as between two cities, within a city or a neighborhood. On the other hand, long-distance food product delivery may be even international or intercontinental and may implement one or more different delivery vehicles of which all or only a portion may prepare food product. Depending on the type of delivery distance, the delivery vehicle may be a small truck, a semi-truck, a train, a watercraft, or a container arranged to fit in any one or more of the listed vehicles. Diagram 100A shows an example interstate delivery route on a map 110 with starting station 114, intermediary waypoints 116, and final delivery destination 118.

According to some embodiments, the delivery truck 112 may be equipped with modular food preparation equipment that include robotic devices such that food items can be prepared autonomously into one or more food products while the delivery truck 112 is en route. An on-board controller may manage operations of the robotic devices to prepare the food items according to timing requirements of the travel route. In some examples, the on-board controller may receive travel information, food item information, and/or food product information from a remote computing device such as a server 106. Travel information may include any one or more of one or more delivery destinations, one or more potential routes between delivery destinations, road condition information for the potential routes, traffic condition information for the potential routes, licensing information, vehicle information, and/or weather condition information for the potential routes. The food items information may include source information, quantity information, quality information, and/or type information associated with ingredients for the food product to be prepared. The food product information may include quantity information, quality information, type information, and/or packaging information associated with the food product to be prepared.

The on-board controller may communicate 109 with the server 106 and/or with other resources such as a global positioning system server via wired media such as a wired network or direct-wired connection, or wireless media such as acoustic, radio frequency (RF), microwave, infrared (IR) and other wireless media (e.g., terrestrial based or satellite based). In some cases, a backend system including a number of servers (e.g., server 104) and other general purpose of special purpose devices (e.g., satellite 108) communicating over a network 102 may collect the travel information, food item information, and/or food product information, and provide travel and/or food preparation/processing instructions to the on-board controller. In other cases, the on-board controller may receive part or all of the information and generate the instructions itself.

In some examples, food items or ingredients for the food products may be received by the delivery truck 112 may be received all at the starting station 114 or at various intermediary waypoints 116, Similarly, prepared food products may be delivered all to the final delivery destination 118 or at some of the intermediary waypoints 116 as well. In other examples, updated traffic information or delivery instructions may be received while en route. For example, the truck may be instructed to deliver the prepared food products to a new delivery destination 119. Upon receiving the updated information, food preparation steps and their timing may be adjusted to ensure the food product(s) is properly prepared timely for arrival at the delivery destination.

Figure 1B:
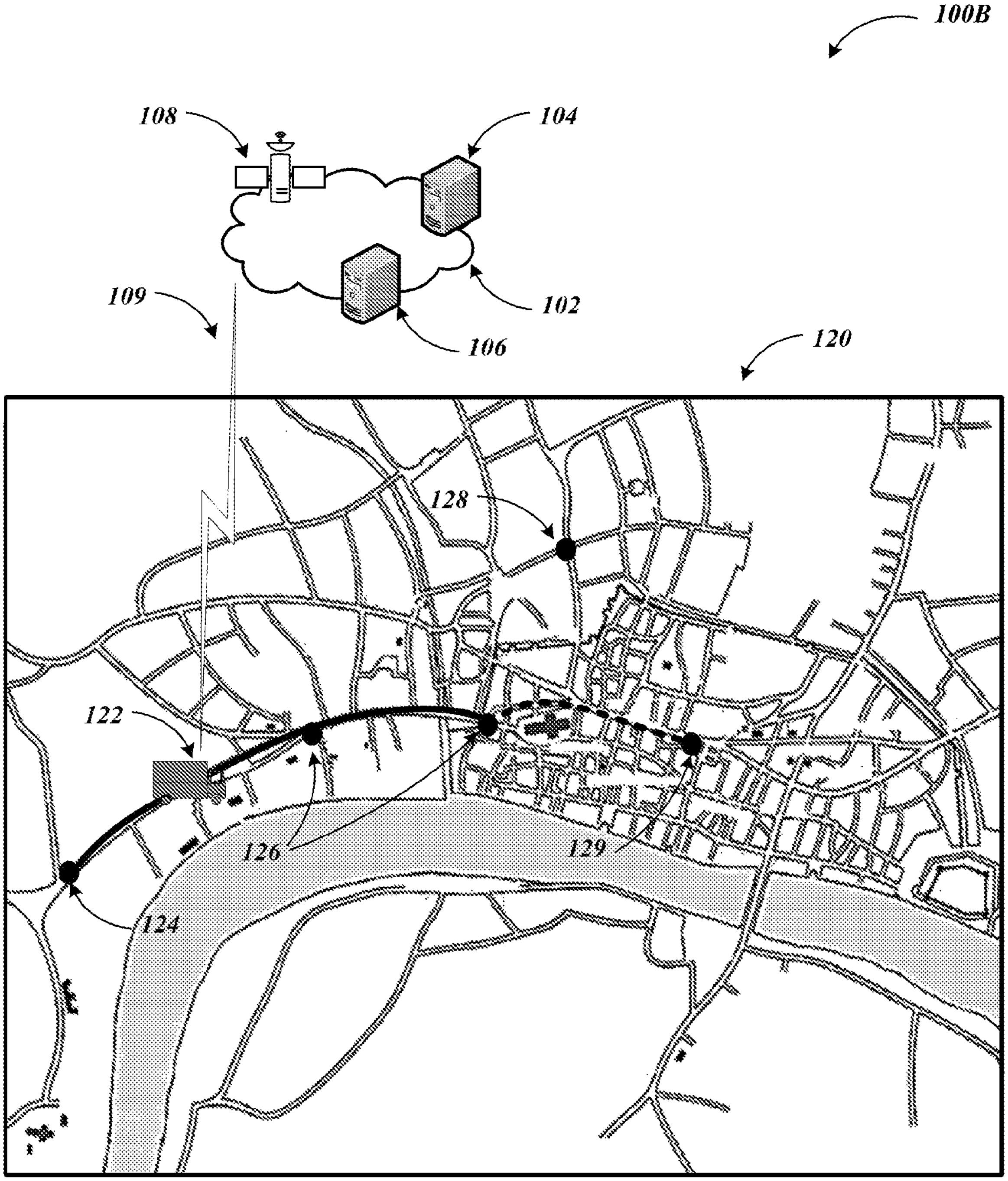
FIG. 1B includes another conceptual illustration of an example short-range truck based en route food product preparation system over a map of London.

FIG. 1B includes another conceptual illustration of an example short-range truck based en route food product preparation system over a map of London, arranged in accordance with at least some embodiments described herein.

Diagram 100B shows a short-distance food product delivery on map 120 with the delivery truck 122 having an in-city travel route having a starting station 124, intermediary waypoints 126, and final delivery destination 128. The delivery truck 122 may be completely autonomous, capable of moving from one location to another under its own control or the control of a remote processor-based system without user input or user control. Alternatively, the delivery truck 122 may be semi-autonomous, capable of moving from one location to another under its own control or the control of a remote processor-based system. For example, the delivery truck 122 may be capable of moving from one location to another under with a minimal amount of user input or minimal amount of user control.

The size and shape of the delivery truck 122 may depend at least in part on licensing requirements of the locality, the street layout, and/or the surrounding environment of the locality in which the delivery truck 122 is intended to operate. For example, small, tight city streets may require a delivery vehicle that is comparatively shorter and/or narrower than a delivery vehicle that can safely and conveniently navigate larger, suburban thoroughfares. As in the long-distance food delivery example of FIG. 1B, travel information or other information update(s) while en route may cause the delivery truck 122 to change its route or even head to a new delivery destination 129.

Figure 2:
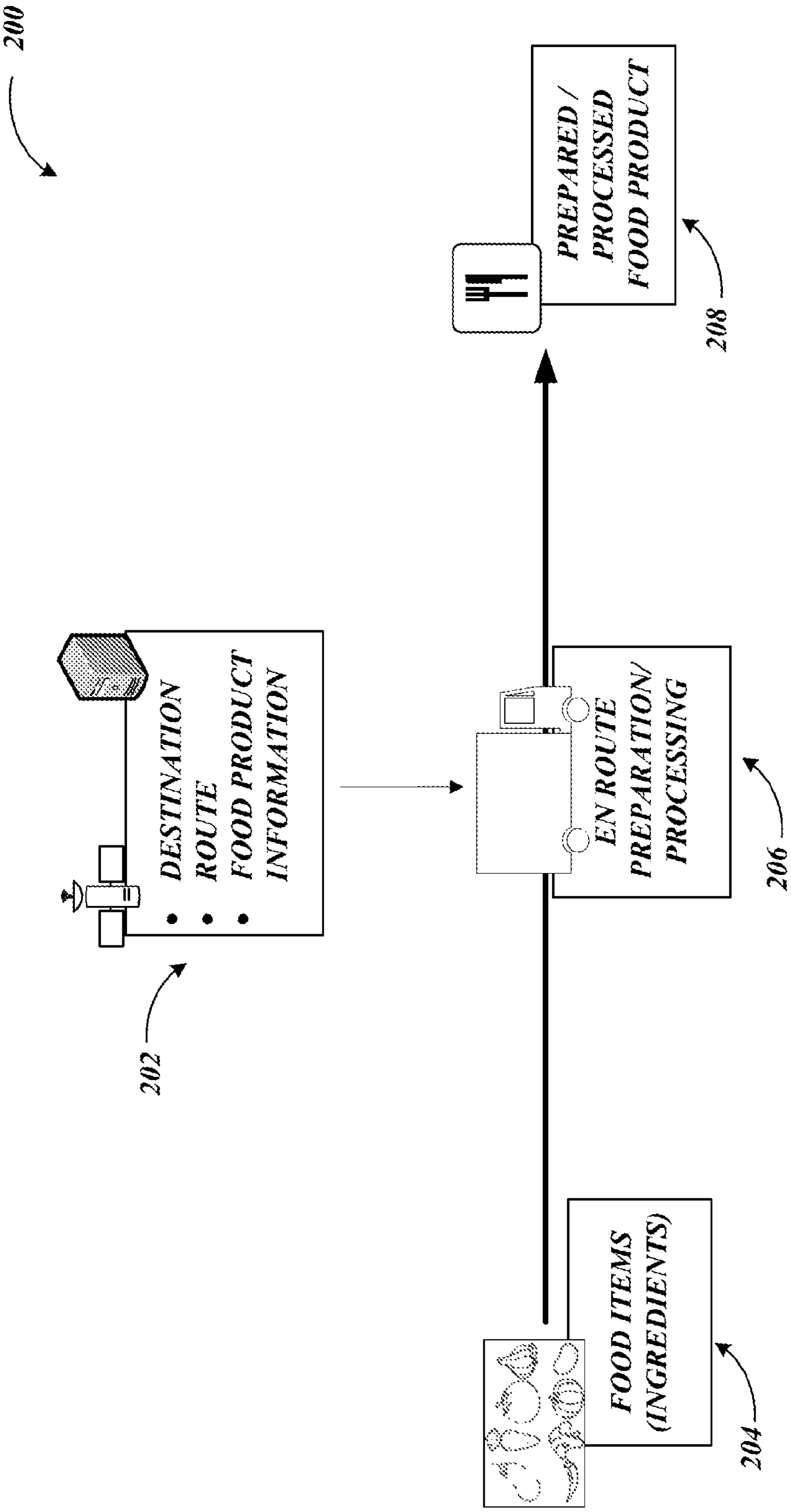
FIG. 2 includes a high-level block diagram for an example en route food product preparation system.

FIG. 2 includes a high-level block diagram for an example en route food product preparation system, arranged in accordance with at least some embodiments described herein.

As shown in diagram 200, a delivery vehicle equipped for en route preparation may receive food items 204 (raw materials, ingredients, and similar items to be processed) and deliver prepared and/or processed food product 208 to a delivery destination. En route preparation 206 may include a multi-step process, where operational parameters (e.g., temperature for heating or cooling a food item, water pressure for washing a food item, slicing or blending speeds, etc.) and timing of each step may be determined and/or adjusted based on travel route parameters such as road conditions, weather conditions, traffic congestion, expected arrival time, etc. Weather conditions may include one or more temperature, humidity, altitude, winds, wave size, etc. Road conditions may include one or more of road curvatures, road tilt (or expected vehicle tilt), construction, road roughness, etc.

A control system 202 may receive information associated with the food items (their quantity, quality, type, etc.), food product (quantity, quality, type, packaging, etc.), and/or travel information. The control system may determine operational parameters of the process steps and their timing based on the received information and instruct an autonomous food product preparation system in the delivery vehicle to perform the steps of the process based on the operational parameters and timing. The control system 202 may also send instructions for travel to the delivery vehicle (autonomous driving or for vehicle driver).

The autonomous food product preparation system in the delivery vehicle may include one or more food preparation and storage equipment arranged in one or more sealable container modules configured to feed each other. The delivery vehicle may include a truck, a railway car, and/or a watercraft or any other suitable vehicle. Alternatively, the autonomous food product preparation system may be installed in a container, which may be affixable to and transportable by one or more vehicles. In some cases, updated travel information such as addition of a new intermediate waypoint, elimination of an existing intermediate waypoint, change of the delivery destination, change of vehicle type or status, or selection of a different route may be received while en route. In response, operational parameters and timing of the steps of the process for food product preparation may be adjusted such that the food product is in a desired preparation state when the vehicle arrives at the destination.

In an example scenario, a pizza delivery truck may receive ingredients at a food processing plant and receive instructions to deliver different types and amounts of pizza to a number of destinations. A control system may determine possible travel routes for the delivery truck and suggest a selected route. The route may be selected based on fastest arrival or based on time needed to complete preparation (which may include preparation of the pizza product, par-baking the pizza food product and/or fully baked pizza food product) of the pizzas. An order of delivery destinations may also be selected based on requested delivery time or based on preparation times needed for the different pizzas. For example, a delivery destination that requested pizzas with longest preparation time may be placed as the last destination, whereas a delivery destination that requested only cheese pizzas may be selected as the first destination. Operational parameters and timing such as temperature of the pizza oven and baking time may be adjusted based on changing traffic conditions.

In another example scenario, a cargo container may be fitted with sauce preparation equipment in a modular fashion. Tomatoes and other ingredients (e.g., garlic, onion, salt, pepper, sugar, basil, olive oil, etc., any of which may be in its raw ingredient state or partially prepared as an intermediate ingredient) may be loaded into a container, which may be on a railway car. As the train leaves the farm, the control system may determine the travel time to a destination station, where finished and packaged sauces are expected to be delivered to shops. The control system may instruct modular preparation equipment to wash, sterilize, skin, and crush the tomatoes, which are then blended with other ingredients, cooked, cooled, and packaged. Each module may perform its assigned step of the process and provide its output to the next module. For example, process steps of the food preparation may be accomplished while the vehicle is in motion, and the process steps may be modified or adjusted dynamically by the control system based on the travel information. For example, the process step may be paused based on travel information, such as waiting at a way point, high winds on the route, estimated or determined vehicle conditions exceeding operational parameters (e.g., high winds, vehicle tilt, or road roughness creating vehicle or equipment vibrations or state exceeding safety or operational standards, etc.). If a process step (including food item transfer) is paused, the control system may adjust the equipment processing parameters (equipment speed, temperature, etc.) of that processing step when resumed and/or one or more following process steps, may select a different route to a destination to improve the estimated vehicle conditions (avoid weather or road conditions, etc.), or use/adjust any other process step or vehicle or travel information as appropriate to ensure the food product is properly prepared when the vehicle reaches its destination.

Additionally or alternatively, operating conditions of the process step and/or food preparation equipment may be adjusted based upon the travel information and/or determined operating conditions of the vehicle. For example, the equipment parameters may be decreased, e.g., speed lowered, based upon determined (estimated or measured) travel information or vehicle parameters such as high vehicle sway or vibration. Similarly, process parameters including temperature, process (e.g., rising or cooking) time and or even ingredients may be adjusted based upon a determined environmental change of the travel information (e.g., altitude, temperature, humidity, etc.) change which may require different preparation parameters or even process. In some cases, equipment operational parameters may be dynamically adjusted based on determined (expected, predicted or measured) container or vehicle parameters based on travel information. For example, equipment may be placed in a closed operation status if vehicle parameters exceed some operational requirements (temperature, to reduce spillage, spoilage, equipment malfunction, etc.). In some cases, the selected food preparation equipment may be changed based on determined (expected, predicted or measured) container or vehicle parameters and travel information. For example, a closed system food preparation equipment (e.g., auger, agitator, plunger etc.) may be selected or adjusted for a processing step based on the travel information, as opposed to an open system food preparation equipment like a conveyor, mixer, etc. In some cases, the control system may pause food preparation at a waypoint stop or may increase food preparation or transfer at a waypoint stop (e.g., when the vehicle is being weighed at a weigh station, when the vehicle is being charged/fueled, or at an operator rest stop, etc.). In some cases, if the container temperature is too hot, equipment operations may be paused or adjusted to meet process requirements.

Additionally or alternatively, the control system may match certain processing steps with certain portions of the route and/or select different travel information based upon the determined effect of the travel information on one or more of the process steps. The control system may monitor progress of the sauce preparation process and adjust timings according to the train's progress along the route such that all sauce is finished and packaged by the time the train reaches its destination. The container may also be loaded to a semi-truck or ship for continued or new travel route and continued processing. In some cases, the control system may compare measured preparation information with expected or estimated preparation information for that particular food preparation process step and adjust process and/or food preparation equipment properties directly (add/remove heat, add oxygen,) and/or adjust preparation process.

Figure 3A:
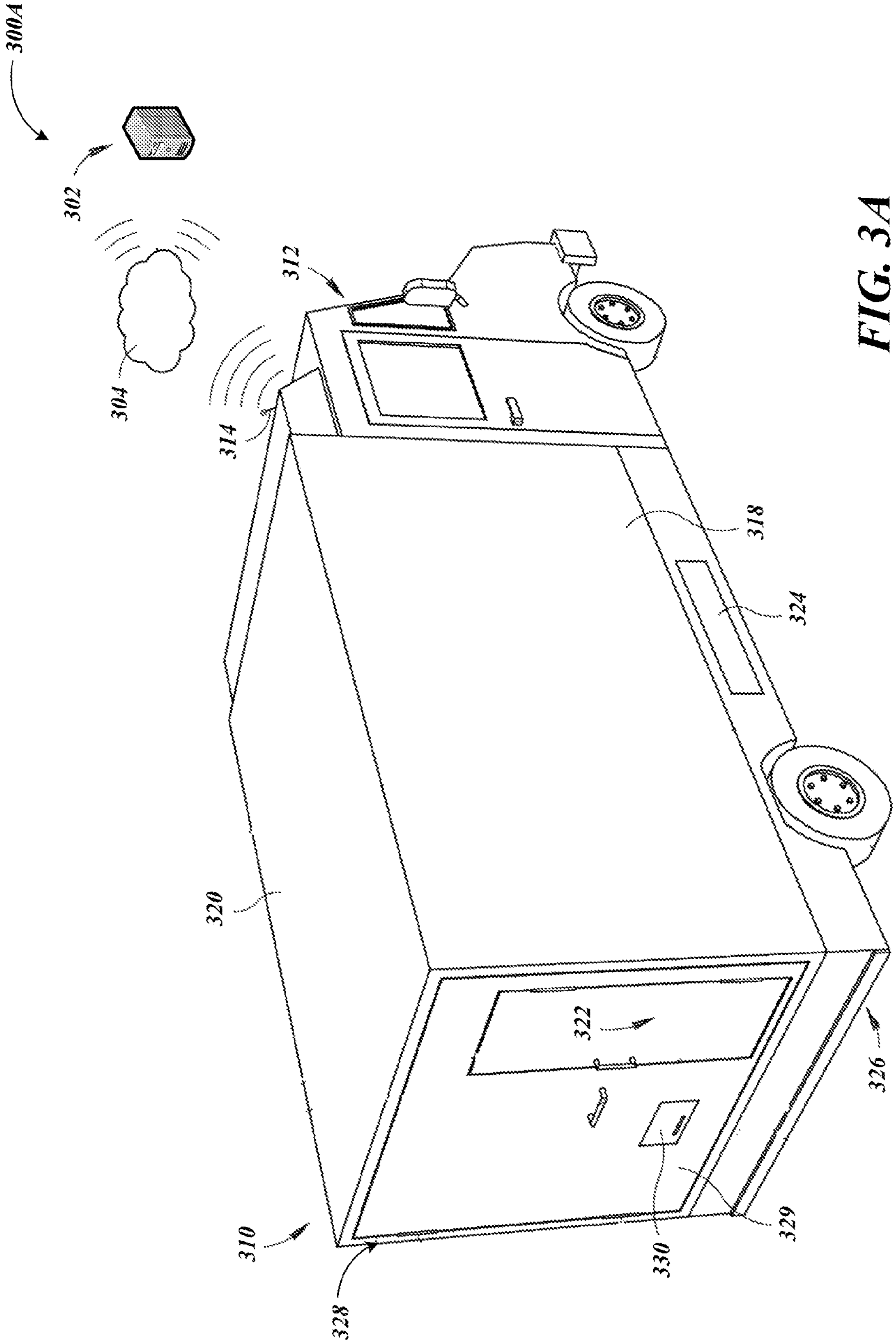
FIG. 3A includes an isometric exterior view of an example truck equipped with food preparation equipment for en route food product preparation.

FIG. 3A includes an isometric exterior view of an example truck equipped with food preparation equipment for en route food product preparation, arranged in accordance with at least some embodiments described herein.

Diagram 300A shows an exterior view of a delivery truck that includes a cab portion 312 and a cargo portion 310, according to at least one illustrated implementation. The delivery truck may further include a wireless communications interface, such as one or more antennas 314 coupled to an internally installed transceiver. The one or more antennas 314 may, for example, be located on or above the roof of the cab portion 312. The antenna(s) 314 may be communicatively coupled to enable communication between components on the delivery truck and a remote control system 302 located remotely from the delivery truck via a communications network 304. The cargo portion 310 may include a top side 320, a left exterior side wall (not shown) and a right exterior side wall 318 (collectively exterior side walls 318), a back wall 328, and a bottom side 326. The dimensions (width, length, and height) of the cargo portion 310 may be based on local or state ordinances regarding delivery, such as, for example, local or state ordinances governing food delivery vehicles, as well as, delivery environment needs (size of streets, parking spaces), delivered/processed food products, etc.

The back wall 328 may include one or more loading doors 329 that are sized and dimensioned to provide access to a cargo area enclosed within the cargo portion 310 of the delivery truck. In some implementations, the loading door(s) 329 may be a single door that stretches substantially across (i.e., >50%) the width of the back wall 328. In such an implementation, the loading door 329 may include a single set of hinges that may physically and rotationally couple the loading door 329 to the vehicle, or the loading door 329 may comprise multiple doors, such as a set of double doors, that together stretch substantially across (i.e., >50%) the width of the back wall 328. The back wall 328 may also include a personnel door 322 located within the loading door 329. The personnel door 322 may be physically, rotationally coupled to the loading door 329 by a set of one or more hinges. The personnel door 322 may rotate in the same direction or in the opposite direction as the loading door 329 in which the personnel door 322 is located. The dimensions, e.g., width and height, of the personnel door 322 are smaller than the corresponding dimensions of the loading door 329, for example (<33%) of the width along the back wall 328. The personnel door 322 may be set within the loading door 329 relatively closer to one or the other exterior side walls 318, or the personnel door 322 may be centered within the loading door 329 relative to the exterior side walls 318. In some implementations, the loading door 329 may include one or more additional small doors 330 that may be smaller than the personnel door 322. The small doors 330 may enable food products to be passed from the cargo portion to a person or customer standing outside of the vehicle.

In some scenarios, an exterior surface of one or both of the side walls 318 may be used to attach a static image, a display monitor, or an electronic paper for informational, advertising, or branding purposes. In case of display monitor or electronic paper, displayed information may be location-based, that is, it may change depending on the location of the delivery vehicle, food product being delivered, etc. Displayed information may be pre-loaded to an on-board controller or dynamically changed by the remote controller.

In some examples, the static image, the display monitor, or the electronic paper may be arranged to cover a majority or substantially all of the exterior side walls and the remaining surfaces of the delivery truck may be generic. That way, by changing the displayed information, a brand identity presented by the delivery truck may be completely changed with minimal effort and time. For example, the delivery truck may be configured to reflect the brand and products of a first business (e.g., a bakery) in the morning. Then, in the afternoon, the brand and products presented on the static image, the display monitor, or the electronic paper may be modified to represent a second business (e.g., a pizza delivery company).

The cargo portion 310 may be fitted with food preparation equipment to allow preparation and food items manually, semi-autonomously, or fully autonomously while the delivery truck is en route. One or both of the exterior side walls 318 may include one or more food slots that may be used to deliver a hot, prepared food item, for example a pizza, that has been packaged for delivery. The size, dimension, and position of the food slots may be based, for example, on the type of food item that is to be prepared and delivered.

In some example embodiments, the delivery truck may be used as a delivery hub. For example, the delivery truck may pick up ingredients (food items) at a source and drive to a central location for expected deliveries (e.g., a parking lot, a business, etc.). The food items may be prepared into finished food products (and packaged) ready for delivery by the time the delivery truck arrives at its destination. Once the delivery truck is parked (or in some cases, still en route), completed and packaged food products may be provided to human delivery people, airborne or ground-based drones for delivery to end destinations (e.g., homes, businesses, schools, hospitals, etc.). The delivery drones may be manually controlled by a human who is located locally or remotely from the delivery robot, and/or controlled autonomously, for example using location input or coordinate from an on-board GPS or GLONASS positioning system and receiver for from one or more wireless service provider cellular towers. In some implementations, location input and/or positioning may be provided using on-board telemetry to determine position, vision systems coupled with pre-recorded photos of the surrounding environment, peer-to-peer relative positioning with other autonomous or non-autonomous vehicles, and/or triangulation with signals from other autonomous or non-autonomous vehicles. In some implementations involving multiple delivery drones, the delivery drones may make deliveries during overlapping time periods.

Figure 3B:
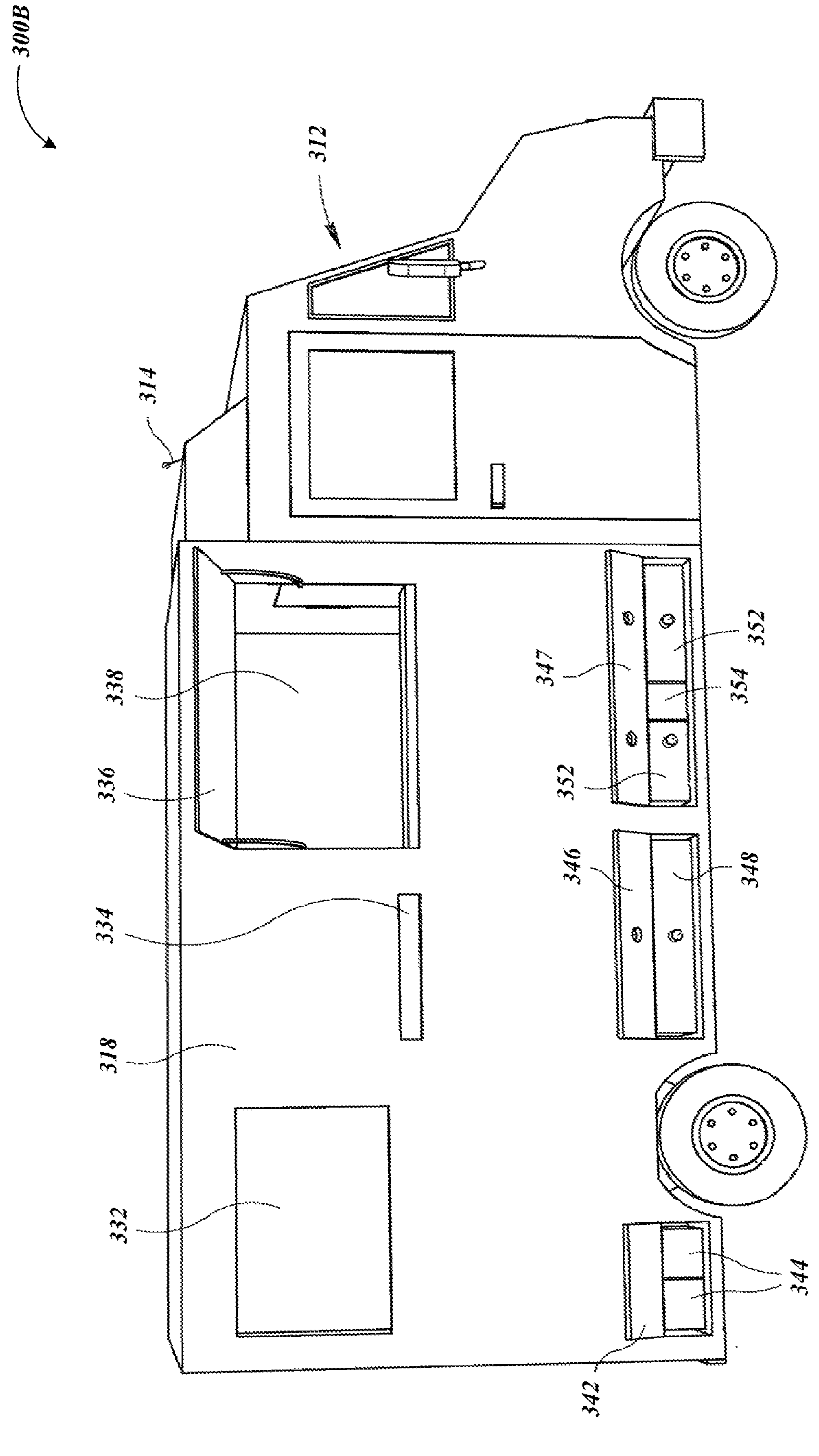
FIG. 3B includes an isometric exterior view of another example truck equipped with food distribution equipment and food preparation equipment for en route food product preparation.

FIG. 3B includes an isometric exterior view of another example truck equipped with food distribution equipment and food preparation equipment for en route food product preparation, arranged in accordance with at least some embodiments described herein.

Diagram 300B shows the delivery truck of FIG. 3A with a different configuration, where side wall 318 may include display monitor 332, service window 338, delivery slot 334, and different size ports with access covers 342, 346, and 347. Service window 338 may include an access cover 336 and be used for receiving customer orders, providing food product to customers or delivery people/drones. Delivery slot 334 may be used in a similar way. The service window 338 may be sized, dimensioned, and located to facilitate transactions between customers and operators of the delivery truck and/or drones thereof. The location of the service window 338 may be modified based upon the layout of equipment within the cargo area. In some implementations, the access cover 336 of the service window 338 may be rotated upwards and outwards to form a canopy over the service window 338. In some implementations, an additional canopy may be attached to the exterior side wall 318 above the service window 338 (or at other locations) and extended when the delivery truck is parked. The service window 338 may be aligned with a counter and/or payment system (cash register, card reader, point-of-sale (POS) terminal, etc.) that may be controlled by an operator of the delivery truck. A POS terminal may include a wireless access point, which allows orders to be placed and paid for by a customer via a mobile device (e.g., smartphone, tablet computer). This may allow of customer to place and pay for an order before arriving at the delivery truck, so freshly prepared food is ready on the customer's arrival. This may also allow the customer to pick up an order with minimal or even no human interaction with a server, cook or other human. The service window 338 may be conveniently located at or close to the end of a food preparation assembly line or area at which hot, prepared food may be placed to be sold or conveyed to customers. In some implementations, a customer may place an order using a kiosk or point of sale terminal that may be accessible by the customer. Such a kiosk or terminal may be physically attached to the vehicle or a part thereof. Alternatively, the kiosk or terminal may be detached and spaced from the vehicle, such as a kiosk or terminal that is wirelessly coupled to the vehicle for processing of the customer order.

Display monitor 332 may provide images of the interior of the cargo area during food preparation operations, a menu, brand information, and/or advertisements. A size and location of the delivery slot 334 may be selected based on delivered food product. For example, a delivery slot for pizza may be wider and shorter in height than a delivery slot used for prepared and packaged hamburgers. The delivery slot 334 may be used to deliver food items automatically (e.g., to drones) after the food item has been prepared within the cargo area.

The access covers 342, 346, and 347 may cover one or more compartments of the cargo portion and selectively, removably and/or rotationally couple to one of the exterior side walls 318 of the delivery truck to selectively provide access to respective compartments. Each access cover may be sized and dimensioned to completely cover the corresponding compartment. Each access cover may be physically coupled to the exterior side wall 318 of the cargo portion via one or more of hinges, hooks, fasteners, locks, locking devices, latches, or other devices or mechanisms that may be used to secure a panel to wall or other vertical surface to cover an aperture. The compartments 344, 348, 352, and 354 may be used to store various tanks of liquids or gases that may be used to prepare and serve food items. For example, the compartments 344, 348, 352, and 354 may store a potable water tank that carries potable water, a waste fluid tank that carries waste fluids, and a pressurized gas tank that may hold a supply of pressurized gas (e.g., air, nitrogen, carbon dioxide). Various types and sizes of ports (e.g., couplers) may be provided for access to the supply containers (tanks) to replenish the supplies or empty the tanks through active or passive systems.

One or more of the compartments may be used to house a power supply, for example a battery, electrical power generator, or other energy storage/generation component. The power supply may provide power to the systems in the delivery truck in general, as well as to the devices, robots, and other electrical equipment used to prepare food during food preparation operations. The power supply(ies) may be electrically coupled to one or more electrical power busses that may provide power to the cargo portion at one or more voltages. The power supplies may include one or more of: a battery or set of batteries, a gas generator, a propone generator, a chemical battery cell(s), an ultra-capacitor cell (s), or some other form of power supply. In some implementations, for example, the power supplies may include at least two different power supplies (e.g., a power generator and power storage) that provide at least two separate voltages to the vehicle. In some implementations, an access cover may enable fuel supply tanks, such as propone tanks, to be coupled to the appropriate power generator when food is being prepared within the cargo portion of the delivery truck.

Figure 3C:
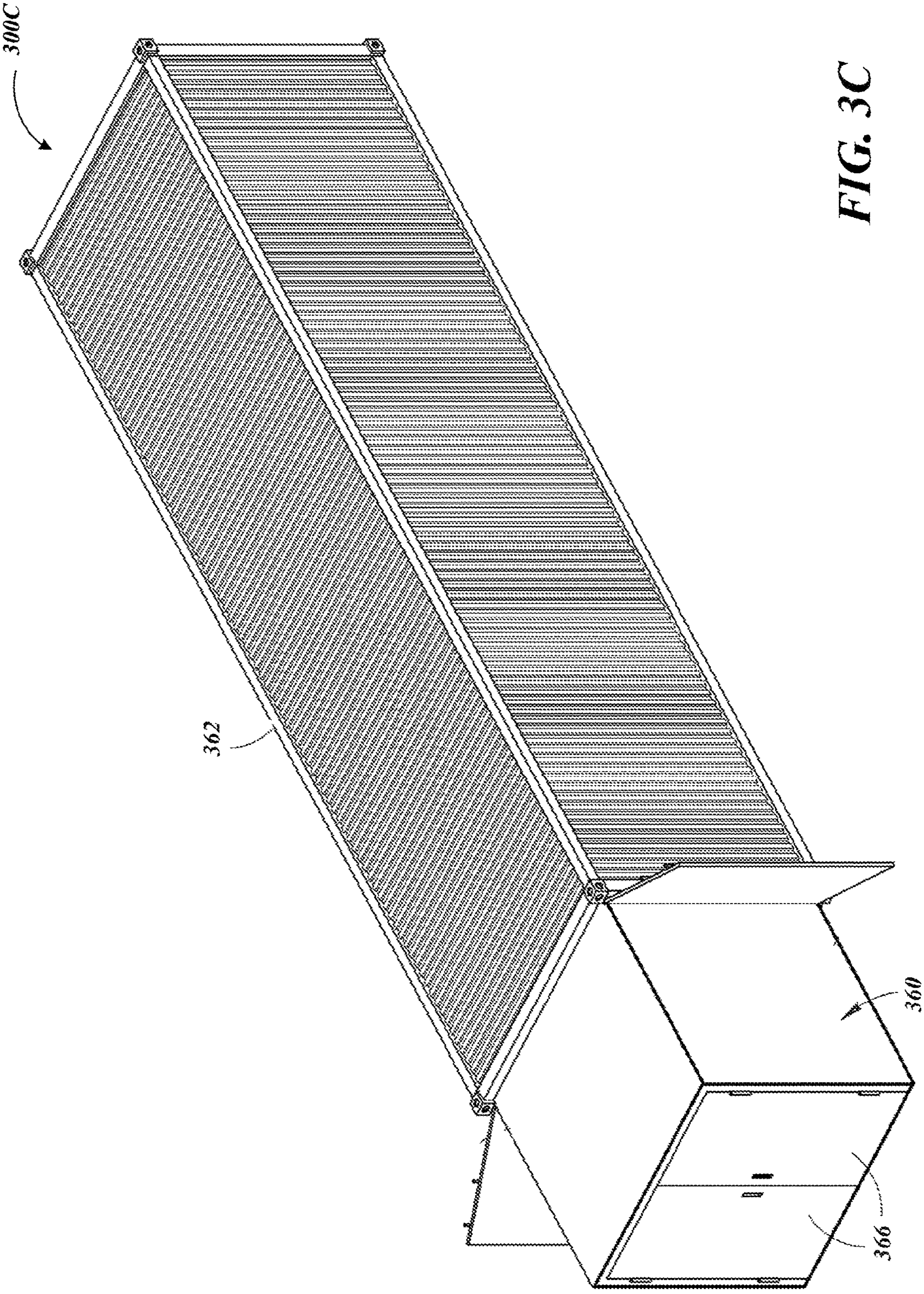
FIG. 3C includes an isometric exterior view of an example cargo container equipped with food preparation equipment for en route food product preparation.

FIG. 3C includes an isometric exterior view of an example cargo container equipped with food preparation equipment for en route food product preparation, arranged in accordance with at least some embodiments described herein.

Diagram 300C shows a standard intermodal shipping container 362. The container 362 may have same or similar features as corresponding standardized shipping containers in use throughout the world, and dimensions and other characteristics in accordance with corresponding standards for shipping containers. In some implementations, the container 362 may have an external an elongated side face, a top face, and a front end comprising a pair of doors.

In some embodiments, a food preparation container 360 may be dimensioned to slide into and fit inside a shell of the shipping container 362. The food preparation container 360 may include a pair of doors 366 for access to the inside space. The food preparation container 360 may be configured to house autonomous food preparation equipment such that food items may be loaded into the container at a starting station and food products may be completed by the time the food preparation container 360 reaches its destination. The food preparation container 360 may have access ports as discussed above in conjunction with the delivery truck. Thus, in some cases, the dimensions of the food preparation container 360 may be smaller than the shipping container 362 acting as the outer shell.

In some alternative implementations, the food preparation container 360 may be configured and dimensioned to slide into and fit inside a semi-truck trailer, loaded onto a flatbed truck, a railway car, a watercraft, or similar vehicles. The food preparation container 360 may be installed in such vehicles with or without the shipping container 362 acting as outer shell. The food preparation equipment inside the container 360 may be configured in a modular fashion to provide a sterile environment for preparation of food items autonomously. As such, the food preparation container 360 may include suitable control, power, communications, and computing equipment in addition to the food preparation equipment such as transport or processing robots, cooking devices, cooling devices, storage equipment, etc.

Figure 3D:
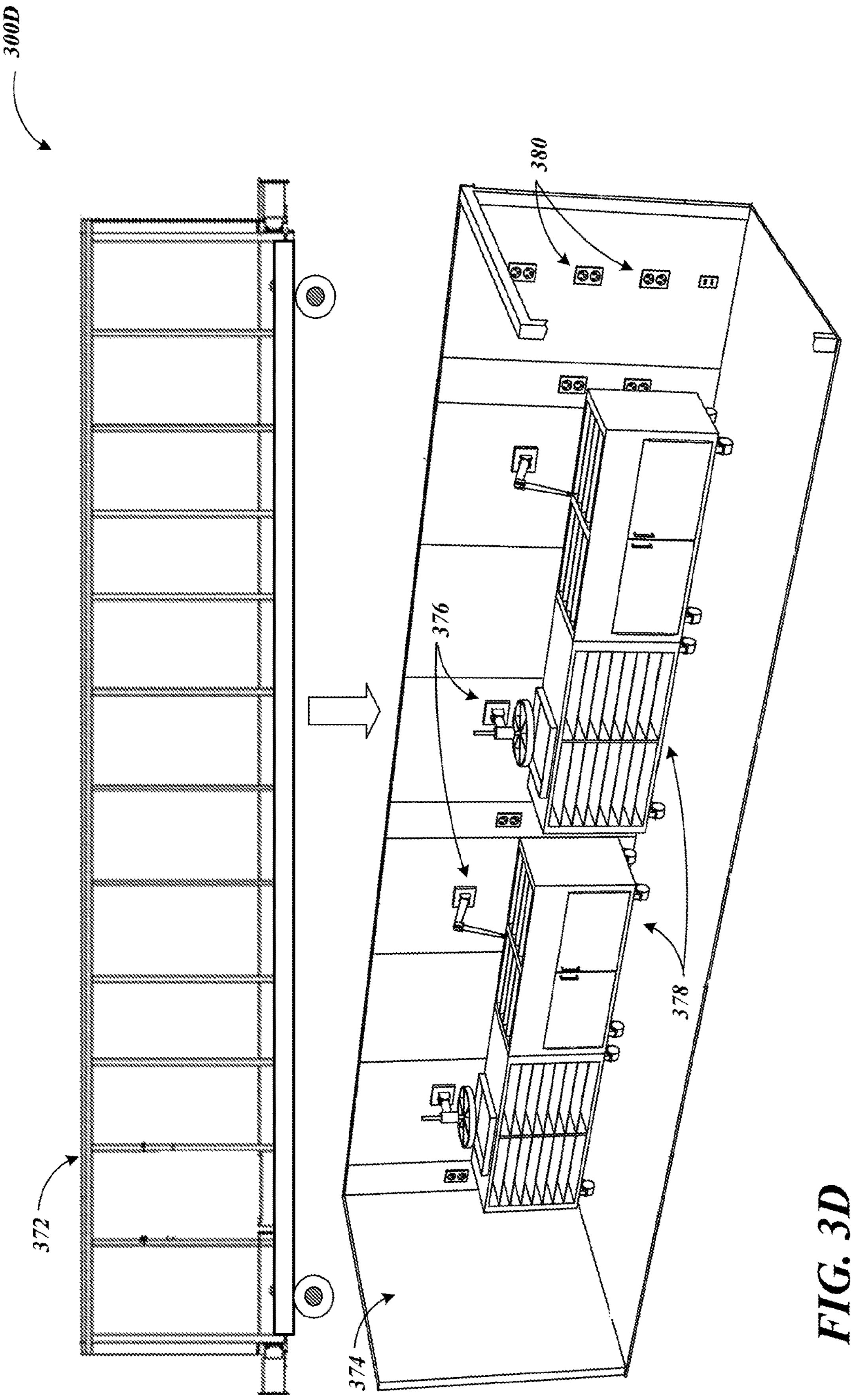
FIG. 3D includes an isometric exterior view of an example railway car equipped with food preparation equipment for en route food product preparation.

FIG. 3D includes an isometric exterior view of an example railway car equipped with food preparation equipment for en route food product preparation, arranged in accordance with at least some embodiments described herein.

Diagram 300D shows a food preparation container 374 with food processing equipment 378, robotic devices 376, and various supply interfaces (e.g., power outlets 380) as described above. The food preparation container 374 may be installed on a railway car. In some examples, the food preparation container 374 may include an outer shell like the shipping container 362 of FIG. 3C and be loaded onto a flat railway car for a portion of the route, and then loaded onto another vehicle (e.g., a transport ship) for another leg of the route. Additionally or alternatively, the food preparation container 374 may be fitted inside an existing container 372 of a vehicle, e.g., railway car, transport ship and/or container truck for one or more legs of the complete route of the food preparation container and may be transferred to another vehicle for portions of the route. While the food preparation container 374 (and the shipping container 362 of FIG. 3C) are shown without access windows, example embodiments may include access windows enabling delivery of food products or intake of food items on exterior surfaces of the container.

Figure 4A:
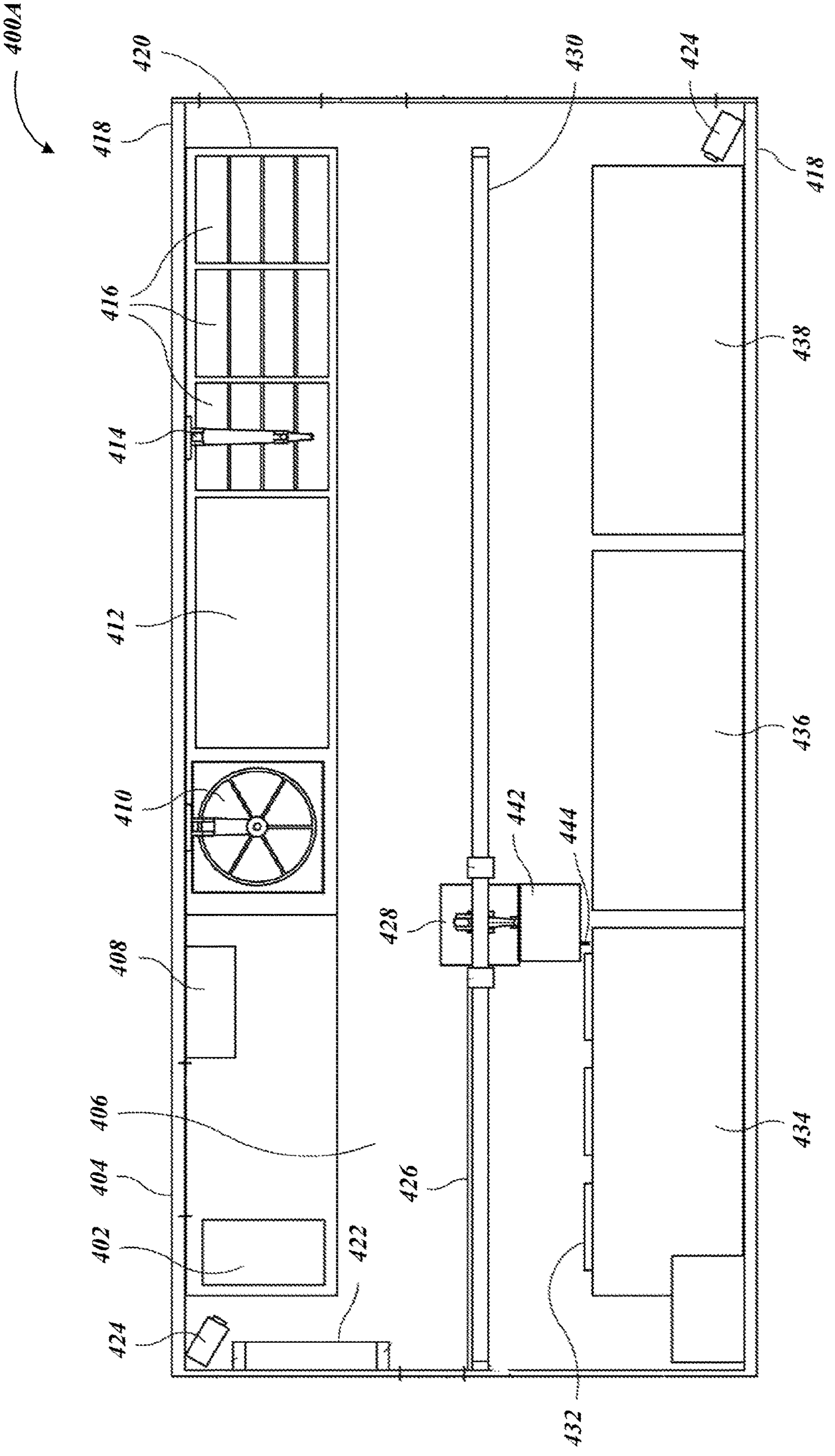
FIG. 4A includes a top plan view of a cargo area of a vehicle such as a truck that may be used for en route food product preparation in which the interior includes a number of food preparation equipment for autonomous processing.

FIG. 4A includes a top plan view of a cargo area of a vehicle such as a truck that may be used for en route food product preparation in which the interior includes a number of food preparation equipment for autonomous processing, arranged in accordance with at least some embodiments described herein.

Diagram 400A shows a layout of the cargo area of a vehicle that includes a service window 422. The cargo area further includes a transfer robot 428 that is selectively movable on a rail 430 along the length of the cargo area. The transfer robot 428 may be operable to place food items into and retrieve items from ovens 432 in racks 434. The transfer robot 428 may be operable to place the food items onto a food conveyor 412 proximate a dispensing robot 414. The dispensing robot 414 may be operable to dispense one or more toppings onto the food item, which may then be conveyed via the conveyor 412 towards and onto the cutting surface for the cutter 410. In some implementations, a human operator may be notified to transition the food item onto the cutting surface for the cutter 410. In other implementations, a robot, such as the transfer robot 428, may transition the food item onto the cutting surface for the cutter 410. The cutter 410 may cut the food item, which may then be placed into a container. In some implementations, the human operator may be notified to place a new food container base onto the cutting surface to receive the food item before the cutter 410 is activated to cut the food item. The operator may be notified to remove the food container base, and supported food item, to place a top onto the food container base, thereby preparing the food container for delivery to the customer. In further implementations, a non-food dispenser 408 may be located proximate the cutter 410, such as, for example, between the cutter 410 and the service window 422. The non-food dispenser 408 may dispense one or more non-food items (e.g., utensils or napkins) into or onto the container before the container is provided to the operator or delivered to a customer. In some implementations, the non-food dispenser 408 may include a printer that may be used to adhere one or more labels to the container identifying information relevant to the enclosed order (e.g., food item, recipient, address and/or delivery destination, time order placed, time food item prepared). In some cases, dispensing, transfer, conveyance of food items may be adjusted based on determined travel and environmental information (estimated measured, etc.). For example, a sealed food conveyor may be used when vehicle vibrations or sway are high based on road conditions. Additionally or alternatively, food item transfer processes and/or equipment may be slowed down to accommodate travel information leading to vehicle conditions at edges of operational parameters (high road tilt, vehicle sway or vibration, etc.). Additionally or alternatively, multifunctional equipment (e.g., a food processor, blender, cooking unit like conventional bread machines) may be selected and used for a food preparation process to reduce food item spillage, spoilage, etc. to accommodate expected or measured travel information.

In some implementations, speed racks 436 may be located on one side of the oven rack 434, whereas one or more of the toppings holders 416 (in holding rack 420), cutter 410, and dispensing robots 414, may be located on the opposite side of the rack 434. As such, the food item may be retrieved from the speed rack 436 to be loaded via a first door to the oven 432, and then ejected and/or retrieved from the second side of the oven to be transferred to a food preparation and/or packaging device. In some implementations, the cargo area may be used to prepare food items on-demand.

Such an implementation may be used, for example, when the vehicle is to be used as a food truck to be positioned on the side of a road or in a parking lot (e.g., a parking lot of a sports stadium on game day) to sell food items to customers. In an on-demand situation, the cargo area may include one or more speed racks 436 and a service counter 404. The speed racks 436 may be secured to one or more anchor rails and/or retractable bolts located along the interior side wall 418. The speed racks 436 may be coupled to one or more power outlets, water ports, waste fluid ports, air ports, and/or communications ports located along the interior side wall 418. The speed racks 436 may include a plurality of slots arranged along multiple columns and rows, each of which may be sized and shaped to hold a partially prepared food item (e.g., a parbaked shell for pizza). In some implementations, the speed rack 436 may be a refrigerated enclosure such that the partially prepared food items are kept refrigerated to thereby preserve the freshness and extend the shelf-life of the partially prepared food items.

In other implementations, the speed rack 436 may have wheels or casters, to enable the speed rack 436 to be loaded into the cargo area of the vehicle for further processing and dispatch to delivery destinations. The wheels may optionally be driven by one or more electric motors via one or more drive trains. The transfer robot 428 may be operable to retrieve a partially prepared food item from one of the slots of the speed rack 436 and place the partially prepared food item onto the conveyor 412 proximate the dispensing robot 414. The dispensing robot 414 may be operable to dispense one or more toppings onto the partially prepared food item. The transfer robot 414 may then retrieve the topped, partially prepared food item from the conveyor 412 to be placed into one of the ovens 432 in the rack 434 to be fully baked. After the item has been fully baked the transfer robot 428 may retrieve the food item from the oven to be processed as described above. In some instances, an on-board control system and/or a remote control system may track information related to the contents of each oven and/or speed rack 436 that has been loaded into the vehicle. For example, the on-board control system and/or the remote control system may track for each oven and/or slot in the speed rack 436 the type of food item (e.g., parbaked shell, pepperoni pizza, etc.), the size of the food item, and/or the time that the food item was placed in the speed rack 436 or oven 432.

In some instances, the on-board control system and/or the remote control system may communicate with one or more other systems to determine the overall time that a food item has been placed in the speed rack 436 or oven 432, including time before the speed rack 436 or oven 432 was loaded into the vehicle. In some implementations, the on-board control system may not load all of the ovens 432 with food items for preparation at any one time. Instead, the on-board control system may keep at least some of the ovens 432 empty to process on-demand orders. In other implementations, at least some of the ovens 432 may be kept empty in order to process and prepare food items that are different and have different cooking parameters than food items currently being prepared. The on-board control system and/or the remote control system may set a time limit for keeping each food item within the speed rack 436 or oven 432. If the time limit expires for one of the food items, the on-board control system and/or the remote control system may alert the operator or customer to discard the food item. The on-board control system and/or the remote control system may require that the user provide an input to confirm that the identified food item has been discarded. Such input may include, for example, pressing a switch associated with the oven 432 containing the food item to be discarded or acknowledging a prompt on a computer screen.

In some implementations, the on-board control system and/or the remote control system may have access to one or more sensors or imagers that may indicate that the operator has removed the identified food item. Such sensors may include, for example, one or more images (e.g., cameras 424) that may be used to visually confirm that the oven is empty and/or that the food item has been placed in a waste basket. Such sensors may also include sensors on the oven door that can detect when the door to the oven 432 has been opened. The cargo area may also include an operator area 406 where an operator can stand during an on-demand operation. The operator area 406 may be separated from the area used by the transfer robot 428 by a wall 426 that runs at least partially along the length of the cargo area. The operator area 406 may be around the service counter 44 and proximate the service window 422. In such a situation, the service counter 404 may be built into the cargo area 300. In other implementations, the service counter may be selectively movable from the cargo area and may therefore be secured to one or more anchor rails and/or retractable bolts located along the interior side wall 418. In some implementations, the service counter 404 may include a sink 402 or other wash basin that is sized and dimensioned to provide a wash area for an operator in the operator area 406. The sink may be fluidly coupled to a water tank and a waste fluid tank via one or more water ports and waste fluid ports included along the interior side wall 418.

Figure 4B:
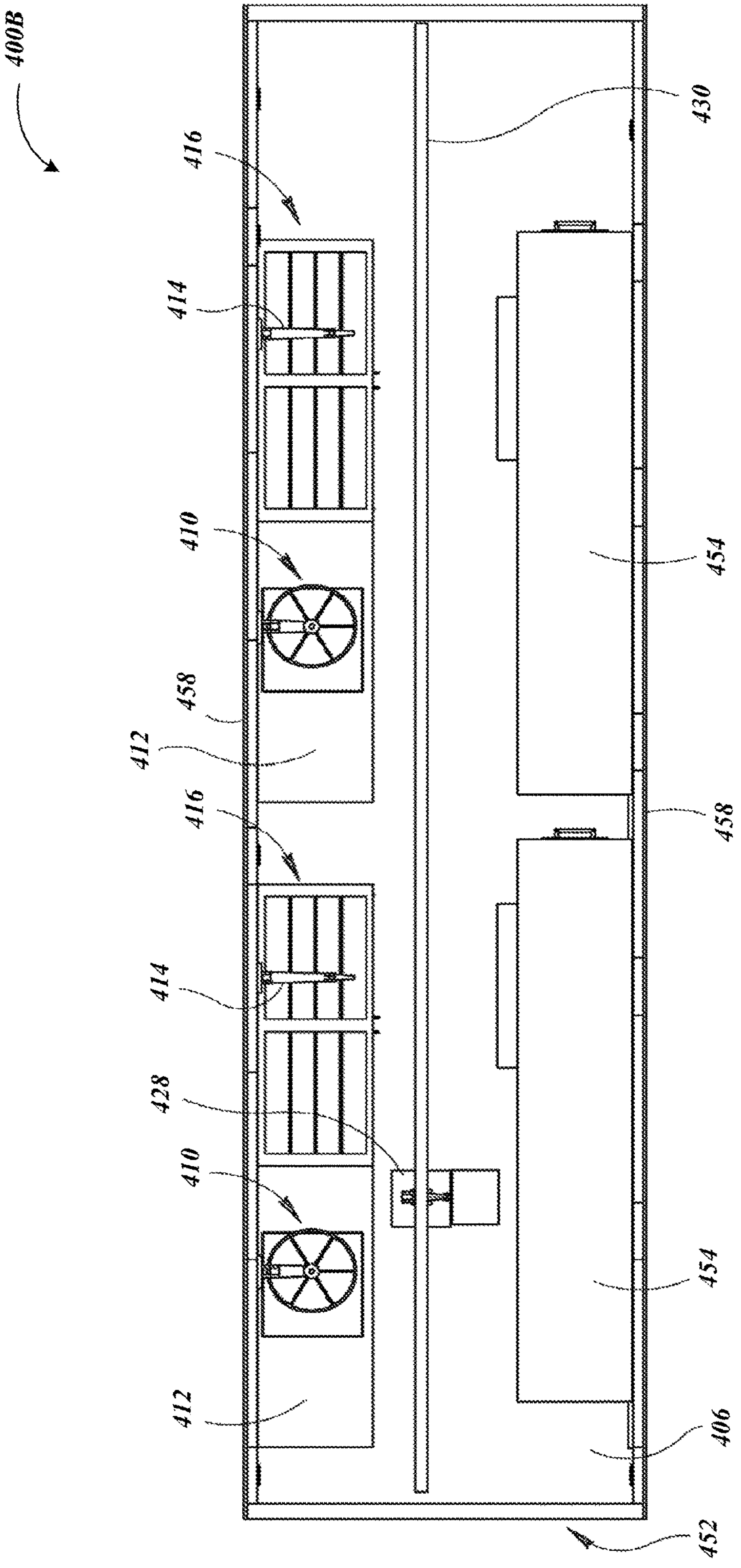
FIG. 4B includes a top plan view of a cargo area of a vehicle such as a railway car or a cargo container that may be used for en route food product preparation in which the interior includes a number of food preparation equipment for autonomous processing.

FIG. 4B includes a top plan view of a cargo area of a vehicle such as a railway car or a cargo container that may be used for en route food product preparation in which the interior includes a number of food preparation equipment for autonomous processing, arranged in accordance with at least some embodiments described herein.

Diagram 400B shows food preparation equipment installed within a container 452 against the walls 458. For example, racks 454 having the same features as the speed racks 436 described above may be installed against the wall 458 and a transfer robot platform 428 may be installed on the rail 430 along the length of the container. As further examples, toppings holders 416, dispensing robots 414, and cutters 410 may be installed against the opposite wall. While specific types of equipment have been illustrated as being installed against the walls 458 of the container, any food preparation equipment, such as any of the food preparation equipment described herein or food preparation equipment capable of performing any of the food processing or preparation procedures described herein, may be installed again the container using any suitable configuration. In some cases, the order in which the equipment is installed against the walls, front-to-back along the length of the container, may not be significant, such as when each piece of food preparation equipment works independently, while in other cases, the order in which the equipment is installed, front-to-back along the length of the container, may be predefined, such as when the products produced by one piece of food preparation equipment are used as an input by another piece of food preparation equipment.

While specific arrangements of food preparation equipment, including arrangements where the equipment is installed against the walls 458, have been illustrated, any arrangement of food preparation equipment may be used within the container. For example, food preparation equipment may be provided in any number of rows, such as one, two, three, four, or five rows extending along the length of the container. As another example, food preparation equipment may be provided in any number of layers, such as one, two, three, four, or five layers stacked vertically on top of one another. In general, the arrangement of the equipment within the interior space of the container may be determined or driven by improvements to the overall efficiency of the food preparation system. Inner surfaces of the walls and doors, as well as, surfaces of food preparation equipment may be made of various plastics or of stainless steel, brass, aluminum, or other oligodynamic materials. Doors, windows, or comparable openings may be closed to seal, such as hermetically seal, the interior of the container from an external environment. In other implementations, the container may have one or more segmented airlocks to control, allow, or prevent the flow of air between the interior of the container and the external environment, and prevent or contain infestations. In some implementations, one or more cleaning systems, such as a robotic cleaning system that sweeps, mops, and/or vacuums various surfaces within the container and/or a UV lighting system may be used to disinfect and self-clean the interior of the container. Such automated and manual cleaning systems and techniques may be combined to maintain a level of cleanliness within the interior of the container that meets or exceeds all legal requirements and other standards for cleanliness in food processing or preparation facilities.

In some implementations, the container may be provided with equipment to control a temperature, a pressure, a humidity, an oxygen level, a carbon dioxide level, a nitrogen level, an argon level, levels of other inert gases, levels of other chemical compositions, and/or other properties of the air within the interior of the container. The equipment may create distinct zones or regions within the interior of the container that have different temperatures, different pressures, different humidities, different oxygen levels, different carbon dioxide levels, different nitrogen levels, different argon levels, different levels of other inert gases, different levels of other chemical compositions, and/or different levels of other properties. Such zones within the container may be used for different purposes, such as to delay oxidation of food items or to accelerate ripening of food items. In one specific implementation, the interior of the container may be compartmentalized into a sanitary food processing or preparation portion and a processed or prepared food storage portion separated from one another by an airlock or an air curtain. In another specific implementation, an entire interior of the container may be refrigerated. The container may also include one or more air sampling and testing systems to test the properties of the air within the container, such as a temperature, a pressure, a humidity, an oxygen level, a carbon dioxide level, a nitrogen level, an argon level, levels of other inert gases, levels or other chemical compositions, and/or any levels of other properties of the air within the interior of the container.

Figure 5:
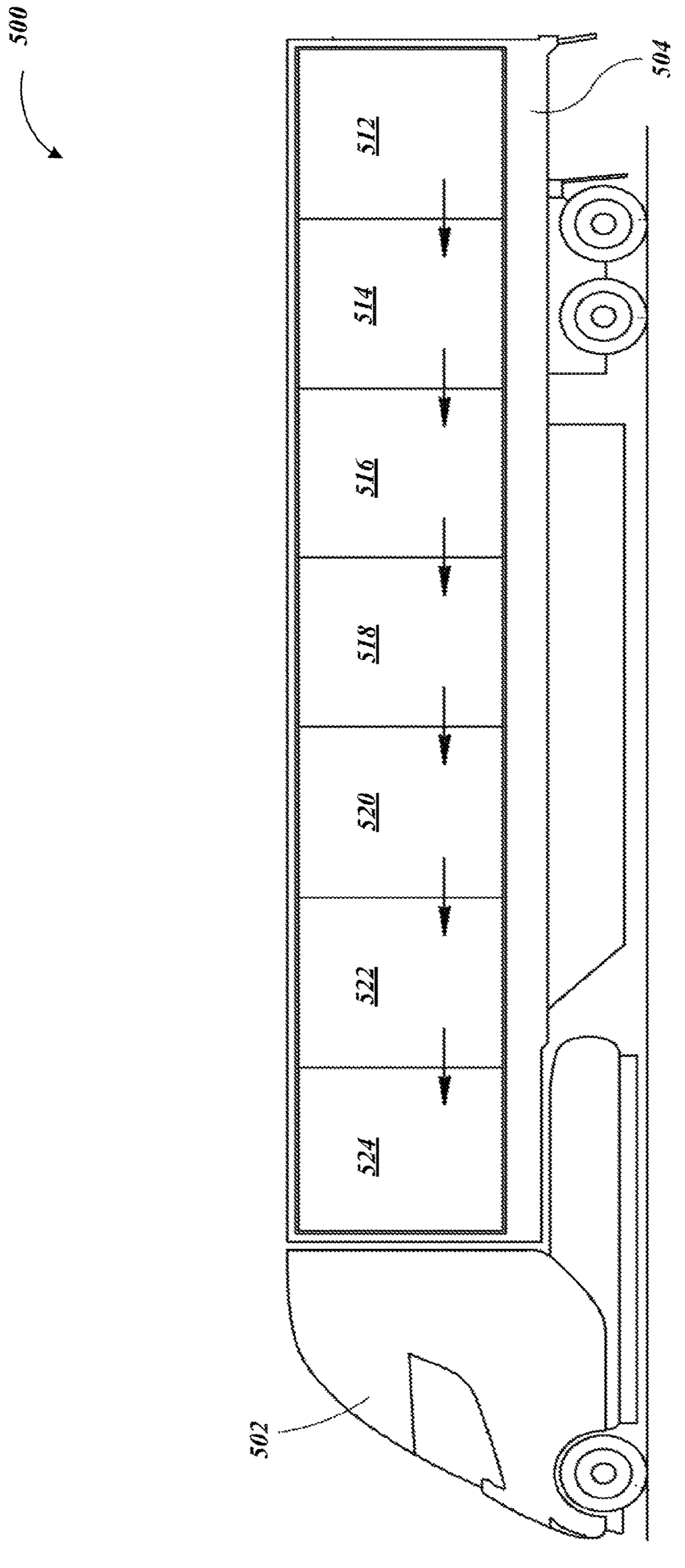
FIG. 5 includes a conceptual illustration of a semi-truck that may be used for autonomous, modular en route food product preparation.

FIG. 5 includes a conceptual illustration of a semi-truck that may be used for autonomous, modular en route food product preparation, arranged in accordance with at least some embodiments described herein.

As shown in diagram 500, a semi-truck may have a cab 502 and a trailer portion 504. The trailer portion 504 may include a container with seven distinct modules. Food preparation equipment installed in the seven distinct modules may be configured to perform different steps of a food preparation process. For example, module 512 may include tomato storage equipment. Module 514 may include tomato steaming equipment. Operational parameters for modules 512 and 514 may include predefined temperatures. Module 516 may include tomato peeling equipment to remove the skin from the tomatoes. Module 518 may include tomato cooling equipment. Module 520 may include tomato milling equipment to remove the seeds, stalk, water, and/or gelatinous portions of the tomatoes from other portions of the tomatoes through a centrifuge and/or reverse osmosis system. Module 522 may include tomato blending equipment to dice, crush, and/or puree the tomatoes. Module 524 may include finishing equipment that creates tomato sauce using the blended tomato material and other ingredients such as spices, etc. and hermetically seal the tomato sauce in one or more sealable food containers such as plastic bags.

Thus, the semi-truck and the food preparation equipment installed therein may pick up fresh, raw tomatoes at a farm and deliver finished tomato sauce to a grocery store or restaurant within the time it takes for the semi-truck to drive from the farm to its destination. The modules 512 through 524 may be configured to provide their output to the next module in a sterile and sealed manner and maintain separations between ingredients and food items while they are being processed or prepared, and final food product for human consumption once they are completed, in order to provide suitable food product for consumers with allergies to specific foods, such as peanuts or gluten. The modules may also maintain separations between ingredients and food items in order to provide vegan, vegetarian, pescatarian, kosher, or halal food, or food acceptable under any other religious or moral code(s).

In some implementations, the primary ingredient may be carbonated, for example, via a carbon dioxide system with a reservoir of carbon dioxide, conduits, valves, actuators (e.g., solenoids, electric motors), compressors, pumps, blowers, operable to introduce carbon dioxide in a gaseous form into the drink or beverage. Often, the drink or beverage will be maintained in bulk form without carbon dioxide during transit, and the carbon dioxide may be added in the delivery vehicle prior to delivery to an end consumer of the drink or beverage.

In other implementations, a delivered drink or beverage may be heated or pasteurized (e.g., flash-pasteurized) via one or more heaters, pressure vessels, water jets, of flash pasteurization systems en route prior to delivery to an end consumer of the drink or beverage. Similarly, frozen or chilled drinks or beverages such as smoothies may be prepared based on timing parameters associated with expected arrival at the final delivery destination. For example, a smoothie may be prepared early on the route and stored in a chilled storage appliance. Another type of smoothie, which may coagulate if not consumed soon as production, may be prepared later on the route and chilled storage time minimized based on the expected arrival time.

Figure 6:
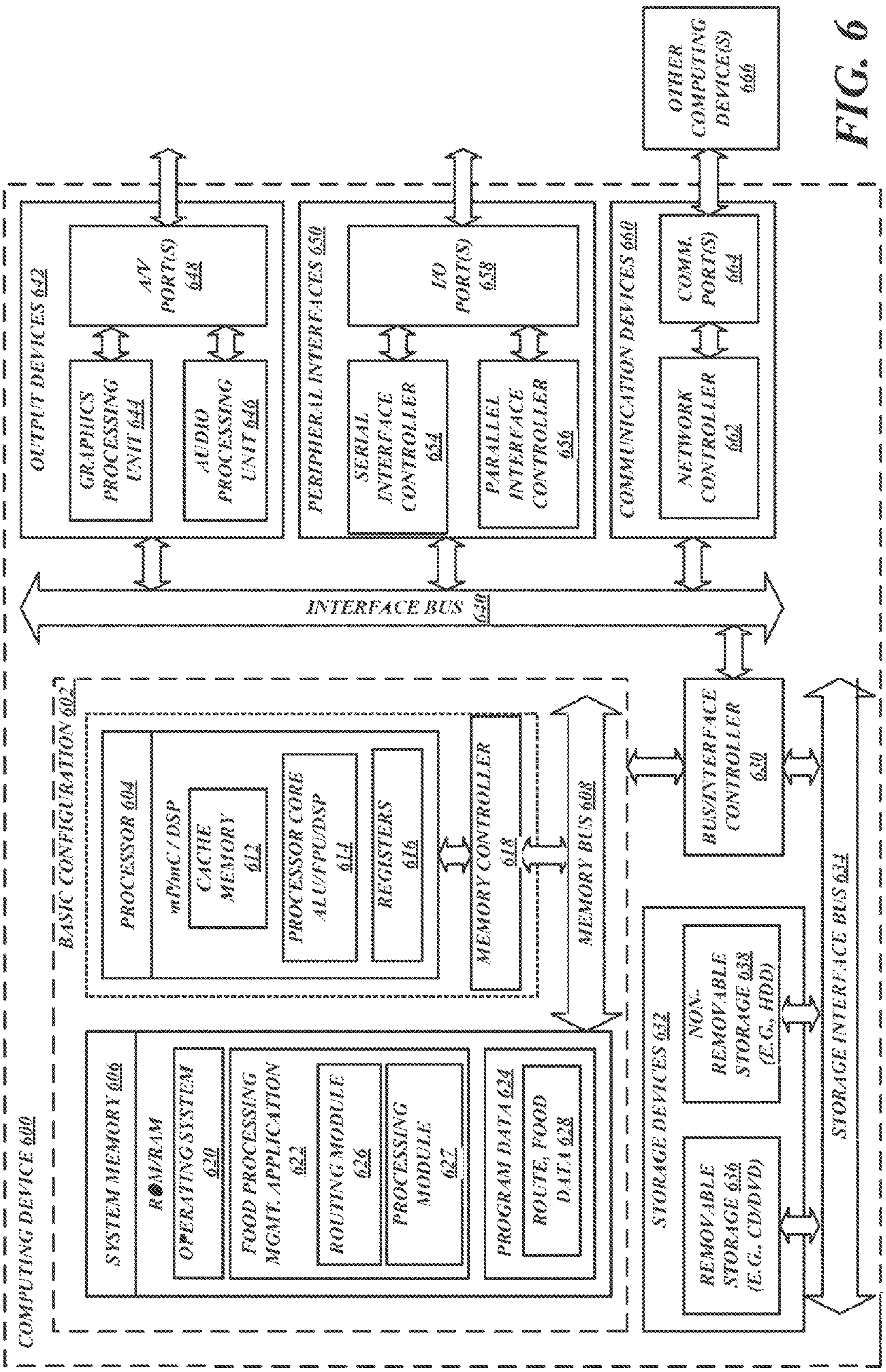
FIG. 6 illustrates a computing device, which may be used to manage an example en route food product preparation system.

FIG. 6 illustrates a computing device, which may be used to manage an example en route food product preparation system, arranged in accordance with at least some embodiments described herein.

In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one or more levels of caching, such as a cache memory 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a food processing management application 622, a routing module 626, and a processing module 627. The food processing management application 622, in conjunction with the routing module 626, may direct a vehicle equipped to prepare food items to a delivery destination. The routing module 626 may provide instructions to an on-board controller to direct the vehicle to the final delivery destination along with one or more intermediary waypoints, selected or available routes, and provide additional information such as traffic/road/weather conditions that may be used to adjust food processing parameters such as timing. The processing module 627 may determine and adjust steps of the food item preparation process and provide instructions to the on-board controller to manage robotic devices in preparing the processing the food items. The program data 624 may include route and food data 628, among other data, as described herein. Route data may include destination, available or recommended routes, traffic information, travel time information, etc. Food data may include information associated with food items (e.g., raw materials), desired food products, preparation steps, timings, etc.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 650, and one or more communication devices 660) to the basic configuration 602 via the bus/interface controller 630. Some of the example output devices 642 include a graphics processing unit 644 and an audio processing unit 646, which may be configured to communicate to various external devices such as a display or speakers via one or more A/V ports 648. One or more example peripheral interfaces 650 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 660 includes a network controller 662, which may be arranged to facilitate communications with one or more other computing devices 666 over a network communication link via one or more communication ports 664. The one or more other computing devices 666 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include non-transitory storage media.

The computing device 600 may be implemented as a part of a specialized server, mainframe, or similar computer that includes any of the above functions. The computing device 600 may also be implemented as a personal computer including both laptop computer and non-laptop computer configurations.

FIG. 7 is a flow diagram illustrating an example method for en route food product preparation, arranged in accordance with at least some embodiments described herein.

Example methods may include one or more operations, functions, or actions as illustrated by one or more of blocks 722, 724, 726, 728, 730, 732, and 734, which may in some embodiments be performed by a computing device such as the computing device 710 in FIG. 7 and/or other general purpose and specialized devices communicatively coupled to the computing device 710. Such operations, functions, or actions in FIG. 7 and in the other figures, in some embodiments, may be combined, eliminated, modified, and/or supplemented with other operations, functions or actions, and need not necessarily be performed in the exact sequence as shown. The operations described in the blocks 722-734 may be implemented through execution of computer-executable instructions stored in a computer-readable medium such as a computer-readable medium 720 of a computing device 710.

An example process for en route food product preparation may begin with block 722, "DETERMINE TRAVEL INFORMATION FOR A VEHICLE EQUIPPED TO PREPARE A FOOD PRODUCT EN ROUTE", where travel information such as delivery destination, one or more potential routes between delivery destinations, road condition information for the potential routes, traffic condition information for the potential routes, weather condition information for the potential routes, vehicle type and requirements, route licensing requirements, and similar ones may be determined (e.g., received, scheduled, predicted, etc.) from one or more resources. In some examples, an estimated time to reach the delivery destination may be determined based on the travel information.

Block 722 may be followed by block 724, "DETERMINE FOOD ITEMS INFORMATION AND FOOD PRODUCT INFORMATION ASSOCIATED WITH THE FOOD PRODUCT TO BE PREPARED", where food items information such as quantity information, quality information, or type information associated with ingredients for the food product to be prepared , and food product information such as quantity information, quality information, type information, or packaging information associated with the food product to be prepared may be received from one or more resources.

Block 724 may be followed by block 726, "DETERMINE FOOD PRODUCT PREPARATION PROCESS", where one or more steps of the process for preparing the food items may be determined based on the food item information and food product information associated with the food product to be prepared. Additionally, food product preparation process may also be determined based on food preparation equipment information (e.g., equipment available, operational requirements, etc.), and travel information.

Block 726 may be followed by block 728, "DETERMINE TIMING FOR FOOD PRODUCT PREPARATION PROCESS BASED ON THE TRAVEL INFORMATION", where timing such as an initiation time, a duration, or a termination time for each step of the process to prepare the food product may be determined based on the food item information, food product information, equipment information, and/or travel information.

Block 728 may be followed by block 730, "AUTONOMOUSLY EXECUTE THE FOOD PRODUCT PREPARATION PROCESS IN THE VEHICLE BASED ON THE DETERMINED TIMING SUCH THAT THE FOOD PRODUCT IS PREPARED WHEN THE VEHICLE REACHES A DESTINATION", where robotic devices in the vehicle may perform steps of the process to prepare the food product based on the timing instructions received from the on-board controller. Performance of the steps such as their order, timing, and other operational parameters may be adjusted based on instructions from the on-board controller.

Block 730 may be followed by optional block 732, "DETERMINE UPDATED TRAVEL INFORMATION WHILE EN ROUTE", where route, delivery destination, intermediate waypoint(s), one or more potential routes between delivery destinations, road condition information for the potential routes, traffic condition information for the potential routes, weather condition information for the potential routes, and similar ones may be received.

Block 732 may be followed by optional block 734, "UPDATE A TIMING AND EXECUTION OF THE FOOD PRODUCT PREPARATION PROCESS BASED ON THE UPDATED TRAVEL INFORMATION", where operational parameters associated with the individual steps of the process to prepare the food product and timing of the steps may be adjusted based on the received travel information. For example, a currently executed step may be modified along with other steps to be executed.

The operations included in the process described above are for illustration purposes. En route food product preparation may be implemented by similar processes with fewer or additional operations, as well as in different order of operations using the principles described herein. The operations described herein may be executed by one or more processors operated on one or more computing devices, one or more processor cores, and/or specialized processing devices, among other examples.

According to some examples, a method for en route food product preparation is described. The method may include receiving travel information for a vehicle equipped to prepare a food product en route; receiving food items information and food product information associated with the food product to be prepared; determining one or more steps and a timing for a process to prepare the food product based on the travel information, the food items information, and the food product information; and autonomously executing the process in the vehicle based on the determined one or more steps and the timing such that the food product is prepared when the vehicle reaches a delivery destination.

According to other examples, receiving the travel information for the vehicle may include determining one or more delivery destination locations, one or more potential routes between the delivery destinations, road condition information for the potential routes, traffic condition information for the potential routes, or weather condition information for the potential routes. The method may further include determining an estimated time to reach the delivery destination. Receiving the food items information may include receiving one or more of quantity information, quality information, or type information associated with ingredients for the food product to be prepared. Receiving the food product information may include receiving one or more of quantity information, quality information, type information, or packaging information associated with the food product to be prepared. Determining the one or more steps and the timing for the process to prepare the food product may include determining one or more of an initiation time, a duration, or a termination time for each step for the process to prepare the food product.

According to further examples, the method may also include receiving updated travel information while en route; re-determining the one or more steps and the timing for the process to prepare the food product based on the updated travel information; and adjusting a currently executed step and one or more yet-to-be executed steps of the process to prepare the food product. Receiving the updated travel information while en route may include receiving instructions for one or more of addition of a new intermediate waypoint, elimination of an existing intermediate waypoint, change of the final delivery destination, or selection of a different route. The method may further include pausing a step of the process in response to the updated travel information; and resuming the step after a time period determined based on an updated expected arrival time at the delivery destination. The method may also include adjusting one or more of an operational parameter of a step of the process or a travel parameter associated with the vehicle in response to the updated travel information.

According to yet other examples, the method may further include matching one or more of an operational parameter of a step of the process to a portion of a travel route based on the travel information. The method may also include adjusting a travel parameter associated with the vehicle in response to the execution of the one or more steps of the process. Autonomously executing the process in the vehicle may include performing one or more of washing, peeling, seeding, destemming, cutting, dicing, slicing, crushing, pureeing, blending, steaming, cooking, heating, broiling, boiling, simmering, frying, cooling, freezing, pressing, crushing, grinding, pasteurizing, fermenting, sterilizing, or packaging the food items, the food product, or a combination thereof. Autonomously executing the process in the vehicle may also include executing the one or more steps in one or more sealable containers, wherein the one or more sealable containers are arranged in a modular fashion to feed each other.

According to some examples, a modular food product preparation system to prepare food items en route is described. The system may include a container having a first port to receive the food items, a second port to deliver prepared food products, a plurality of anchors, and a plurality of utility ports; one or more food preparation and storage equipment attached to the plurality of anchors and configured to execute one or more steps of a process to prepare the food items; and a controller communicatively coupled to robotic devices on each of the one or more food preparation and storage equipment and at least one remote computing device. The controller may be configured to control operations of the robotic devices to autonomously execute the process en route based on the one or more steps and a timing for each of the steps such that the food product is prepared when the container reaches a delivery destination, where the one or more steps and the timing for the process to prepare the food product are determined based on travel information, food items information, and food product information.

According to other examples, the travel information may include one or more delivery destination locations, one or more potential routes between the delivery destinations, road condition information for the potential routes, traffic condition information for the potential routes, or weather condition information for the potential routes. The food items information may include one or more of quantity information, quality information, or type information associated with ingredients for the food product to be prepared; and the food product information may include one or more of quantity information, quality information, type information, or packaging information associated with the food product to be prepared. The controller may be configured to receive instructions to control the operations of the robotic devices from the remote computing device based on the one or more steps and the timing for the process to prepare the food product determined from the travel information, the food items information, and the food product information.

According to further examples, the controller may be configured to receive the travel information, the food items information, and the food product information; determine the one or more steps and the timing for the process to prepare the food product based on received the travel information, the food items information, and the food product information; and control the operations of the robotic devices based on the determined one or more steps and the timing for the process to prepare the food product. The controller may be further configured to determine one or more of an initiation time, a duration, or a termination time for each step for the process to prepare the food product based on received the travel information, the food items information, and the food product information. The controller may be further configured to receive updated travel information while en route; re-determine the one or more steps and the timing for the process to prepare the food product based on the updated travel information; and adjust a currently executed step and one or more yet-to-be executed steps of the process to prepare the food product. The updated travel information may include instructions for one or more of addition of a new intermediate waypoint, elimination of an existing intermediate waypoint, change of the delivery destination, or selection of a different route.

According to yet other examples, the one or more food preparation and storage equipment may be configured to perform one or more of washing, peeling, seeding, destemming, cutting, dicing, slicing, crushing, pureeing, blending, steaming, cooking, heating, broiling, boiling, simmering, frying, cooling, freezing, pressing, crushing, grinding, pasteurizing, fermenting, sterilizing, or packaging the food items, the food product, or a combination thereof. The controller may be further configured to pause a step of the process in response to the updated travel information; and resume the step after a time period determined based on an updated expected arrival time at the delivery destination. The controller may be further configured to adjust one or more of an operational parameter of a step of the process or a travel parameter associated with the vehicle in response to the updated travel information. The controller may be further configured to match one or more of an operational parameter of a step of the process to a portion of a travel route based on the travel information. The controller may be further configured to adjust a travel parameter associated with the vehicle in response to the execution of the one or more steps of the process. The one or more food preparation and storage equipment may be arranged in one or more sealable container modules configured to feed each other. The container may be configured to be affixable to and transportable by one or more of a truck, a railway car, and a watercraft.

According to some examples, a truck body to prepare food items en route is described. The truck body may include a container having a first port to receive the food items, a second port to deliver prepared food products, a plurality of anchors, and a plurality of utility ports; one or more food preparation and storage equipment attached to the plurality of anchors and configured to execute one or more steps of a process to prepare the food items; and a controller communicatively coupled to robotic devices on each of the one or more food preparation and storage equipment and at least one remote computing device. The controller may be configured to control operations of the robotic devices to autonomously execute the process en route based on the one or more steps and a timing for each of the steps such that the food product is prepared when the container reaches a delivery destination, where the one or more steps and the timing for the process to prepare the food product are determined based on travel information, food items information, and food product information.

According to other examples, the travel information may include one or more delivery destination locations, one or more potential routes between the delivery destinations, road condition information for the potential routes, traffic condition information for the potential routes, or weather condition information for the potential routes; the food items information may include one or more of quantity information, quality information, or type information associated with ingredients for the food product to be prepared; and the food product information may include one or more of quantity information, quality information, type information, or packaging information associated with the food product to be prepared. The controller may be configured to receive the travel information, the food items information, and the food product information; determine and the timing for the process to prepare the food product based on received the travel information, the food items information, and the food product information; determine the one or more steps, and an initiation time, a duration, or a termination time for each step of the process to prepare the food product based on received the travel information, the food items information, and the food product information; and control the operations of the robotic devices based on the determined one or more steps and timing for each step of the process to prepare the food product. The one or more food preparation and storage equipment may be arranged in one or more sealable container modules configured to feed each other.

According to further examples, a remote controller for en route food product preparation is described. The remote controller may include a communication device configured to communicate with an on-board controller of a modular food product preparation system; a memory to store data; and a processor coupled to the communication device and the memory. The processor, in conjunction with the data stored in the memory, may be configured to receive travel information for the modular food product preparation system; receive food items information and food product information associated with the food product to be prepared; determine one or more steps and a timing for a process to prepare the food product based on the travel information, the food items information, and the food product information; and transmit instructions to control operations of robotic devices in the modular food product preparation system for autonomous execution of the process in the modular food product preparation system based on the determined one or more steps and the timing such that the food product is prepared when the modular food product preparation system reaches a delivery destination.

According to yet other examples, the travel information may include one or more delivery destination locations, one or more potential routes between the delivery destinations, road condition information for the potential routes, traffic condition information for the potential routes, or weather condition information for the potential routes; the food items information may include one or more of quantity information, quality information, or type information associated with ingredients for the food product to be prepared; and the food product information may include one or more of quantity information, quality information, type information, or packaging information associated with the food product to be prepared. The processor may be further configured to receive updated travel information while en route; re-determine the one or more steps and the timing for the process to prepare the food product based on the updated travel information; and adjust a currently executed step and one or more yet-to-be executed steps of the process to prepare the food product. The updated travel information may include instructions for one or more of addition of a new intermediate waypoint, elimination of an existing intermediate waypoint, change of the delivery destination, or selection of a different route. The processor may be configured to transmit the instructions to control the operations of the robotic devices in the modular food product preparation system such that the one or more steps are executed in one or more sealable containers arranged in a modular fashion to feed each other.

Certain specific details are set forth herein in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices such as ovens, skillets, and other similar devices, closed- loop controllers used to control cooking conditions, food preparation techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

As used herein the term "travel information" refers to delivery destination locations, one or more potential routes between the delivery destinations, road condition information (road curvatures, road tilt, expected vehicle tilt, construction, road roughness, etc.) for the potential routes, traffic condition information for the potential routes, weather condition information (temperature, humidity, altitude, winds, wave size, etc.) for the potential routes, licensing information, and any other conditions that may affect travel of the vehicle equipped to prepare food items en route.

As used herein the terms "food item" and "food product" refer to any item or product intended for human consumption. A "food product" is generally understood to be made by preparing "food items", that is, ingredients, raw or cooked materials, etc., and may also include interim ingredients (e.g., prepared ingredients that may be used to prepare a final food product, e.g., pizza sauce). Although illustrated and described in some embodiments herein in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food items or products, including cooked and uncooked food items or products, and ingredients or components of food items and products.

As used herein the terms "robot" or "robotic" refer to any device, system, or combination of systems and devices that includes at least one appendage, typically with an end of arm tool or end effector, where the at least one appendage is selectively moveable to perform work or an operation useful in the preparation a food item or packaging of a food item or food product. The robot may be autonomously controlled, for instance based at least in part on information from one or more sensors (e.g., optical sensors used with machine-vision algorithms, position encoders, temperature sensors, moisture or humidity sensors). Alternatively, one or more robots can be remotely controlled by a human operator. Alternatively, one or more robots can be partially remotely controlled by a human operator and partially autonomously controlled.

As used herein, the term "food preparation equipment" refers to any equipment or appliance used prepare "food items" including "cooking", but not limited to. For example, "food preparation equipment" may be used to slice, dice, blend, wash, or otherwise process the "food items". For example, food preparation equipment refers to any device, system, or combination of systems and devices useful in the preparation of a food product. While such preparation may include ingredient distribution devices, choppers, peeler, cooking units for the heating of food products during preparation, rolling units, mixers, blenders, etc. and such preparation may also include the partial or complete cooling of one or more food products. Further, the food preparation equipment may be able to control more than temperature. For example, some food preparation equipment may control pressure or humidity. Further, some food preparation equipment may control airflow therein, thus able to operate in a convective mode if desired, for instance to decrease preparation time.

As used herein, food preparation refers to any preparation or process of food items to prepare a food product from that food item and may include any one or more of washing, destemming, peeling, mixing, chopping, blending, grinding, cooking, cooling, and packaging, and the time, temperature speed or any other control or environmental factor of that processing step.

As used herein the term "vehicle" refers to any car, truck, van, train, watercraft, or other vehicle useful in preparing a food item during a delivery process.

There are various vehicles by which processes and/or systems and/or other technologies described herein may be affected (e.g., hardware, software, and/or firmware), and the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

It is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of “two recitations,” without other modifiers, means at least two recitations, or two or more recitations).

Furthermore, in those instances where a convention analogous to “at least one of A, B, and C, etc.” is used, in general, such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as “up to,” “at least,” “greater than,” “less than,” and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method for en route food product preparation, the method comprising:

providing a vehicle comprising:

a cargo area defined by a first side wall and a second side wall;

a plurality of modules disposed within the cargo area and configured to provide an environment for preparation of food items, the plurality of modules comprising a first module disposed against the first side wall and a second module disposed against the second side wall, each module from the plurality of modules having at least one unit of autonomous food preparation equipment;

a rail extending along a length of the cargo area between the first module and the second module; and a transfer robot selectively movable along the rail and configured to transfer food items between the first module and the second module;

receiving travel information for the vehicle via an on-board control system;

receiving, via the on-board control system, food items information and food product information associated with a food product to be prepared in the cargo area using the plurality of modules and the transfer robot selectively movable along the rail;

determining, via the on-board control system, one or more steps and a timing for a process to prepare the food product based on the travel information, the food items information, and the food product information;

performing, using the on-board control system, the determined one or more steps according to the timing using the units of autonomous food preparation equipment, the transfer robot, and the plurality of modules, such that the food product is prepared when the vehicle reaches a delivery destination;

moving the transfer robot along the rail to transfer food between modules in the plurality of modules, wherein the transfer robot is controlled by the on-board control system using at least one optical sensor and a machine-vision algorithm;

receiving updated travel information for the vehicle while the vehicle is en route to the delivery destination at the on-board control system; and controlling, via the on-board control system and without a human operator, at least one of the units of autonomous food preparation equipment and the transfer robot selectively movable along the rail in response to the updated travel information and an estimated time for the vehicle to reach the delivery destination.

2. The method of claim 1, wherein receiving the travel information for the vehicle comprises:

determining one or more delivery destination locations, one or more potential routes between the delivery destinations, road condition information for the potential routes, traffic condition information for the potential routes, or weather condition information for the potential routes.

3. The method of claim 2, further comprising:

determining the estimated time for the vehicle to reach the delivery destination.

4. The method of claim 1, wherein receiving the food items information comprises:

receiving one or more of quantity information, quality information, or type information associated with ingredients for the food product to be prepared.

5. The method of claim 1, wherein receiving the food product information comprises:

receiving one or more of quantity information, quality information, type information, or packaging information associated with the food product to be prepared.

6. The method of claim 1, wherein determining the one or more steps and the timing for the process to prepare the food product comprises:

determining one or more of an initiation time, a duration, or a termination time for each step for the process to prepare the food product.

7. The method of claim 1, further comprising:

re-determining the one or more steps and the timing for the process to prepare the food product based on the updated travel information.

8. The method of claim 7, further comprising:

pausing a step of the process in response to the updated travel information; and resuming the step after a time period determined based on an updated expected arrival time at the delivery destination.

9. The method of claim 7, further comprising:

adjusting a travel parameter associated with the vehicle in response to the updated travel information.

10. The method of claim 1, wherein receiving the updated travel information comprises:

receiving instructions for one or more of addition of a new intermediate waypoint, elimination of an existing intermediate waypoint, change of the final delivery destination, or selection of a different route.

11. The method of claim 1, further comprising:

matching one or more of an operational parameter of a step of the process to a portion of a travel route based on the travel information.

12. The method of claim 1, further comprising:

adjusting a travel parameter associated with the vehicle in response to the execution of the one or more steps of the process.

13. The method of claim 1, wherein the process to prepare the food product comprises autonomously performing one or more of washing, peeling, seeding, destemming, cutting, dicing, slicing, crushing, pureeing, blending, steaming, cooking, heating, broiling, boiling, simmering, frying, cooling, freezing, pressing, crushing, grinding, pasteurizing, fermenting, sterilizing, or packaging the food items, the food product, or a combination thereof.

14. The method of claim 1, wherein the plurality of modules comprises one or more sealable containers, wherein the one or more sealable containers are arranged in a modular fashion to feed each other.

15. The method of claim 1 further comprising:

placing the food product in a delivery slot in the vehicle after it is prepared.

16. The method of claim 1 further comprising:

placing the food product in a delivery slot accessible to the vehicle after it is prepared.

17. The method of claim 1, wherein the transfer robot is coupled to the on-board control system.

18. The method of claim 1, wherein determining the one or more steps and the timing for the process to prepare the food product comprises at least one of decreasing temperature output of food preparation equipment, halting operation of food preparation equipment, changing food preparation equipment, or pausing operation of food preparation equipment.

19. The method of claim 1, wherein the transfer robot is operable to place food items into and retrieve items from an oven.

20. The method of claim 1, wherein the transfer robot is operable to place food items onto a conveyor.

21. The method of claim 1, wherein at least one module from the plurality of modules comprises wheels or casters.

22. The method of claim 1, wherein at least one module from the plurality of modules is secured to the first side wall or the second side wall using one or more anchor rails or retractable bolts.

* * * * *